(12) United States Patent
Tanaka et al.

(10) Patent No.: US 8,733,849 B2
(45) Date of Patent: May 27, 2014

(54) BRAKE CONTROL DEVICE, AND BRAKE CONTROL METHOD

(75) Inventors: Yoshito Tanaka, Nishikamo-gun (JP); Hiroshi Nakaoka, Okazaki (JP); Yasuji Mizutani, Brussels (BE); Eiji Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1194 days.

(21) Appl. No.: 12/442,120

(22) PCT Filed: Oct. 4, 2007

(86) PCT No.: PCT/IB2007/002930
§ 371 (c)(1),
(2), (4) Date: Mar. 20, 2009

(87) PCT Pub. No.: WO2008/041104
PCT Pub. Date: Apr. 10, 2008

(65) Prior Publication Data
US 2009/0315391 A1    Dec. 24, 2009

(30) Foreign Application Priority Data
Oct. 5, 2006    (JP) .................................. 2006-273585

(51) Int. Cl.
*B60T 8/32*    (2006.01)
(52) U.S. Cl.
USPC ...................................................... 303/116.2
(58) Field of Classification Search
USPC .............. 303/113.5, 116.2, 122, 122.09, 155, 303/122.03, 122.04, 122.05
See application file for complete search history.

(56) References Cited

U.S. PATENT DOCUMENTS

| | | | |
|---|---|---|---|
| 5,190,358 A * | 3/1993 | Holzmann et al. | 303/9.71 |
| 5,568,962 A | 10/1996 | Enomoto et al. | |
| 5,978,725 A * | 11/1999 | Kagawa | 701/70 |
| 6,139,119 A * | 10/2000 | Otomo | 303/113.1 |
| 2001/0006306 A1 | 7/2001 | Kagawa et al. | |

(Continued)

FOREIGN PATENT DOCUMENTS

| | | |
|---|---|---|
| CN | 1603186 A | 4/2005 |
| DE | 10 2005 024 342 A1 | 1/2006 |

(Continued)

OTHER PUBLICATIONS

Sakai et al (JP 11-115740) English Translation.*

(Continued)

*Primary Examiner* — Bradley King
*Assistant Examiner* — Stephen Bowes
(74) *Attorney, Agent, or Firm* — Oblon, Spivak, McClelland, Maier & Neustadt, L.L.P.

(57) ABSTRACT

In a brake control device and a brake control method, when a shift to a brake mode for backup involving separation of a supply path of working fluid is performed at the time of detection of an abnormality during braking, a differential pressure acting between an outlet opening and an inlet opening of an open-close valve which is provided between a hydraulic pressure source that is used during the backup brake mode and wheel cylinders and which needs to be opened during the backup brake mode is lessened prior to the separation of the supply path of working fluid so that the open-close valve is opened in accordance with a valve-opening command. Therefore, at the time of switch of the control mode, the confinement of wheel cylinder pressure is avoided.

19 Claims, 7 Drawing Sheets

(56) References Cited

U.S. PATENT DOCUMENTS

| | | | |
|---|---|---|---|
| 2003/0214180 A1* | 11/2003 | Kusano | 303/116.2 |
| 2004/0183367 A1* | 9/2004 | Kusano | 303/11 |
| 2005/0110338 A1* | 5/2005 | Tsunehara | 303/10 |
| 2006/0066146 A1 | 3/2006 | Otomo | |
| 2007/0090690 A1* | 4/2007 | Ohkubo | 303/122 |

FOREIGN PATENT DOCUMENTS

| | | | | |
|---|---|---|---|---|
| EP | 1 110 836 | | 6/2001 | |
| EP | 1 642 795 | | 4/2006 | |
| JP | 7 336806 | | 12/1995 | |
| JP | 11115740 A | * | 4/1999 | ............. B60T 13/66 |
| JP | 2005 219725 | | 8/2005 | |
| JP | 2006 123889 | | 5/2006 | |

OTHER PUBLICATIONS

Office Action issued Nov. 23, 2011 in Chinese Patent Application No. 2007/80037406.5 (with English translation).

* cited by examiner

BRAKE CONTROL DEVICE, AND BRAKE CONTROL METHOD

CROSS-REFERENCE TO PRIORITY INFORMATION

The present application claims priority to Japanese Patent Application No. 2006-273585 filed on Oct. 5, 2006, the entire contents of which including the specification, drawings, and Abstract are incorporated herein by reference in their entirety.

BACKGROUND OF THE INVENTION

1. Field of the Invention

The invention relates to a brake control device and a brake control method that control the braking force applied to wheels provided in the vehicle.

2. Description of the Related Art

Japanese Patent Application Publication No. 2006-123889 (JP-A-2006-123889) describes a hydraulic brake device that includes a hydraulic pressure booster, a master cylinder, a power hydraulic pressure source, and a plurality of brake cylinders. According to this hydraulic brake device, the brake cylinders are selectively connected in communication with the hydraulic pressure booster, the master cylinder and the power hydraulic pressure source through the use of a simple circuit, so that the controllability can be improved. When the system is normal, the working liquid is supplied from the power hydraulic pressure source to the brake cylinders. If an abnormality is detected, the control mode is switched to a control mode that is different from the control mode selected during the normal state. At the time of switching the control mode, a plurality of control valves provided within the brake device are altered in the open/closed state.

It is considered to be desirable that the switching of the control mode as mentioned above be promptly performed. Therefore, the open/closed state of the control valves provided within the brake control device will be altered basically simultaneously. However, depending on the situation immediately prior to the mode switching, there is possibility that hydraulic pressure may be confined in a wheel cylinder due to the switching operation. If the confinement of wheel cylinder pressure occurs, a corresponding one of the wheels is caused to have a drag.

SUMMARY OF THE INVENTION

In view of the aforementioned problems, there is provided, in the invention, a brake control technology that makes it possible to prevent the confinement of wheel cylinder pressure at the time of switching the control mode.

As one aspect of the invention, there is provided a brake control device including: a plurality of wheel cylinders that are supplied with a working fluid and give braking force to a plurality of wheels, respectively; a wheel cylinder pressure control system that controls working fluid pressure of the plurality of wheel cylinders independently of brake operation of a driver; a manual hydraulic pressure source that pressurizes the working fluid contained in the manual hydraulic pressure source in accordance with amount of operation of a brake operating member performed by the driver; a separation valve that is caused to be in a closed state during a brake mode for backup in which the working fluid is supplied from the manual hydraulic pressure source to the wheel cylinders, and that, when in the closed state, separates a first path that supplies the working fluid to at least one wheel cylinder of the plurality of wheel cylinders, and a second path that supplies the working fluid to at least one of the plurality of wheel cylinders excluding the at least one wheel cylinder supplied with the working fluid by the first path; an open-close valve that is provided between the manual hydraulic pressure source and the wheel cylinders, and that is kept in a closed state despite a valve-opening command, due to an effect of a differential pressure between an outlet opening and an inlet opening of the open-close valve, if the differential pressure is greater than a predetermined pressure during the closed state of the open-close valve; and a control portion that closes the separation valve after the valve-opening command so as to lessen the differential pressure so that the open-close valve is opened in accordance with the valve-opening command when discontinuing a control via the wheel cylinder pressure control system and causing a shift to the brake mode for backup.

According to the brake control device described above, at the time of shift to the backup brake mode, the control portion controls the discharge path of working fluid from the wheel cylinders so as to lessen the differential pressure between the outlet and inlet openings of the open-close valve so that the open-close valve is opened in accordance with the valve-opening command. In particular, the control portion controls the open-close valve and the separation valve so as to close the separation valve after the valve-opening command to the open-close valve. For example, when the wheel cylinder pressure is higher than the pressure of the manual hydraulic pressure source, it sometimes happens that the differential pressure between the outlet and inlet openings of the open-close valve is greater than a predetermined pressure. In that case, due to the effect of the differential pressure, there is possibility of the open-close valve being kept in the closed state despite the valve-opening command from the control portion and therefore the hydraulic pressure being confined in the wheel cylinders. This predetermined pressure will be hereinafter referred to as "self-closure-release pressure" as appropriate.

That is, the control portion controls the discharge path of working fluid from the wheel cylinders so that the differential pressure between the outlet and inlet openings of the open-close valve is reduced to the self-closure-release pressure of the valve. In particular, the control portion causes the closure of the separation valve to be later than the valve-opening command to the open-close valve. Therefore, it becomes possible to make the differential pressure acting on the open-close valve smaller than its self-closure-release pressure by releasing the hydraulic pressure on the wheel cylinder side of the open-close valve in one of the two systems to be divided by the separation valve to the other system. When the differential pressure between the outlet and inlet openings of the open-close valve is reduced to or below its self-closure-release pressure, the open-close valve becomes able to be opened in accordance with the valve-opening command, so that the shift to the backup brake mode can be carried out. In consequence, it becomes possible to smoothly complete the shift to the backup brake mode while avoiding the confinement of wheel cylinder pressure caused by the open-close valve being kept in the closed state despite the valve-opening command.

The brake control device may further have the following construction. That is, the manual hydraulic pressure source may include a first hydraulic pressure source that pressurizes the working fluid contained in the first hydraulic pressure source, in accordance with the amount of operation of the brake operating member performed by the driver, and a second hydraulic pressure source that adjusts the pressure of the working fluid in agreement with the working fluid pressure of the first hydraulic pressure source, and the open-close valve may include a first open-close valve provided on a first supply path that connects the first hydraulic pressure source and at least one wheel cylinder of the plurality of wheel cylinders, and a second open-close valve provided on a second supply path that connects the second hydraulic pressure source and at least one wheel cylinder of the plurality of wheel cylinders excluding the at least one wheel cylinder connected to the first hydraulic pressure source, and the first open-close valve may be kept in the closed state despite the valve-opening command if the differential pressure between the outlet opening and the inlet opening of the first open-close valve is greater than a first predetermined pressure, and the second open-close valve may be kept in the closed state despite the valve-opening command if the differential pressure between the outlet opening and the inlet opening of the second open-close valve is greater than a second predetermined pressure, and the second predetermined pressure may be set smaller than a maximum value of the wheel cylinder pressure that is realized by the wheel cylinder pressure control system, and the first predetermined pressure may be set larger than the maximum value.

In this case, when the wheel cylinder pressure is controlled at a high pressure, there is possibility of the differential pressure between the outlet and inlet openings of the second open-close valve being greater than the second predetermined pressure and therefore the second open-close valve being kept in the closed state despite the valve-opening command. With regard to the first open-close valve, on the other hand, since the first predetermined pressure is set larger than the maximum value of the wheel cylinder pressure, the first open-close valve is promptly opened in accordance with the valve-opening command. Therefore, even when the second open-close valve is not immediately opened upon receiving the valve-opening command, the high-pressure wheel cylinder pressure can be released to the first hydraulic pressure source via the first open-close valve. As a result, the wheel cylinder pressure is reduced, and the differential pressure between the outlet and inlet openings of the second open-close valve is lessened. Then, the second open-close valve is eventually opened. In this manner, the brake control device is able to smoothly complete the shift to the backup brake mode while avoiding the confinement of wheel cylinder pressure. Besides, since the second predetermined pressure is set small, this construction is also preferable in that it becomes possible to realize size reduction of the second open-close valve and therefore size reduction of the brake control device.

Furthermore, the control portion may control a discharge path of the working fluid from the wheel cylinders so as to lessen the differential pressure while keeping the wheel cylinder pressure higher than a minimum hydraulic pressure that generates braking force.

This construction makes it possible to complete the shift to the brake mode for backup while retaining a certain amount of braking force. Therefore, the decline in deceleration caused by decline in braking force, that is, so-called deceleration declination phenomenon, can be restrained. Hence, the brake control device is able to smoothly complete the shift to the brake mode for backup during braking while achieving both the avoidance of the confinement of wheel cylinder pressure and the restraint of the deceleration declination phenomenon. Incidentally, the minimum hydraulic pressure that generates braking force herein refers to the minimum wheel cylinder pressure that causes braking force to be given to the wheel, and will hereinafter be sometimes referred to also as "minimum braking hydraulic pressure" as appropriate.

Furthermore, the separation valve may be provided on a channel that connects the first supply path and the second supply path, and, during the brake mode for backup, may separate the first supply path and the second supply path from each other, and the control portion may send the valve-opening command to each of the first open-close valve and the second open-close valve, and may close the separation valve after the differential pressure between the outlet opening and the inlet opening of the second open-close valve has become smaller than the second predetermined pressure.

According to the brake control device described above, the valve-opening command is firstly sent to each of the first open-close valve and the second open-close valve, so that both the first open-close valve and the separation valve are in the open state. Hence, via the separation valve and the first open-close valve, hydraulic pressure is released from the first supply path to the second supply path, so that the differential pressure between the outlet and inlet openings of the second open-close valve is made less than the second predetermined pressure. After that, the control portion closes the separation valve to complete the shift to the backup brake mode. Incidentally, it is from a fail-safe viewpoint that during the backup brake mode, the separation valve is closed to separate the first supply path and the second supply path from each other. Since the closure of the separation valve is caused to be later than the sending of the valve-opening command to the first open-close valve, the differential pressure between the outlet and inlet openings of the second open-close valve can be released to the first hydraulic pressure source via the first open-close valve, without being impeded by the separation valve. In this manner, it is possible to achieve both the avoidance of the confinement of wheel cylinder pressure and the fail-safe performance following the brake mode shift.

Furthermore, the control portion may send the valve-opening command to the second open-close valve prior to the valve-opening command to the first open-close valve. When the wheel cylinder pressure is not very high and the differential pressure between the outlet and inlet openings of the second open-close valve is smaller than the second predetermined pressure, the second open-close valve is immediately opened upon receiving the valve-opening command. Hence, by causing the valve-opening command to the second open-close valve to be earlier than the valve-opening command to the first open-close valve, it becomes possible to firstly release the wheel cylinder pressure to the second hydraulic pressure source. Since the second hydraulic pressure source, unlike the first hydraulic pressure source, does not directly receive the input of the driver's brake operation, this construction is preferable in that the impact transmitted to the driver through a brake operating member, that is, so-called pedal shock, can be reduced as compared with the case where the wheel cylinder pressure is released to the first hydraulic pressure source.

Furthermore, each of the first open-close valve, the second open-close valve and the separation valve may be an electromagnetic control valve that is opened and closed corresponding to presence/absence of electrification with a control current, and the control portion may shift to the brake mode for backup by stopping the electrification of each of the first open-close valve, the second open-close valve and the separation valve with the control current, and an electric current characteristic of each of the first open-close valve, the second open-close valve and the separation valve may be set so that when the electrification with the control current is stopped, the separation valve shifts to a non-electrified-time open/closed state later than the first open-close valve and the second open-close valve.

By setting the electric current characteristics of the valves in this manner, the first open-close valve, the second open-close valve and the separation valve are caused to open/close in an intended open/close sequence without the need for the control portion to control the open/close sequence of these valves. Therefore, this construction is preferable in that the valve open/close control can be simplified. Besides, even when the electrification of the valves suddenly stops due to a failure or the like, the valves are opened/closed in the intended open/close sequence to carry out the shift to the brake mode for backup. Therefore, this construction is also preferable in that the fail-safe performance can be improved.

Furthermore, the control portion may close the separation valve substantially simultaneously with sending the valve-opening commands to the first and second open-close valves or prior to sending the valve-opening commands to the first and second open-close valves, when the control portion shifts to the brake mode for backup due to detection of a leakage abnormality in which the working fluid leaks from at least one of the wheel cylinders. With this construction, when a leakage abnormality is detected, the separation valve is promptly closed to separate the supply path of the working fluid into two systems, regardless of whether or not the differential pressure acting on the open-close valves has been lessened. Therefore, the system in which the leakage abnormality has occurred is separated, and the other system, which is normal, is allowed to generate braking force. This is preferable in terms of fail-safe design.

The brake control device may further include a pressure-reducing valve provided on a channel that connects a reservoir that stores the working fluid and the wheel cylinders, and the control portion may reduce the wheel cylinder pressure by controlling the pressure-reducing valve so that the differential pressure between the outlet opening and the inlet opening of the second open-close valve becomes smaller than the second predetermined pressure, and, after reducing the wheel cylinder pressure, may close the separation valve.

According to the brake control device described above, the control portion firstly lessens the differential pressure between the outlet and inlet openings of the second open-close valve through the pressure-reducing control using the pressure-reducing valve, and then closes the separation valve to complete the shift to the backup brake mode. For example, even when the wheel cylinder pressure cannot be drained to the manual hydraulic pressure source, for example, when the first open-close valve has a closed failure, or the like, the confinement of hydraulic pressure can be avoided by draining the hydraulic pressure through the use of the pressure-reducing valve that controls the discharge of the working fluid to the reservoir. It is preferable from a fail-safe viewpoint to construct a path for releasing hydraulic pressure on the assumption of an abnormality at an arbitrary site.

Furthermore, the control portion may control the pressure-reducing valve so that the pressure-reducing valve is in an open state when the wheel cylinder pressure is greater than a set hydraulic pressure that is set smaller than the second predetermined pressure and that is set larger than a minimum hydraulic pressure that generates braking force, and so that the pressure-reducing valve is in the closed state when the wheel cylinder pressure is lower than the set hydraulic pressure. With this construction, the pressure-reducing control of the wheel cylinder pressure can be performed toward the set hydraulic pressure that is set smaller than the second predetermined pressure and that is set larger than the minimum hydraulic pressure that generates braking force. Since this set hydraulic pressure is set smaller than the second predetermined pressure, the second open-close valve is opened in accordance with the valve-opening command without being impeded by the differential pressure. Besides, since the set hydraulic pressure is set larger than the minimum hydraulic pressure that generates braking force, the shift to the backup brake mode can be carried out while a certain amount of braking force is retained. Hence, the brake control device is able to smoothly complete the shift to the brake mode for backup during braking while achieving both the avoidance of the confinement of wheel cylinder pressure and the restraint of the deceleration declination phenomenon.

According to another aspect of the invention, there is provided a brake control device including at least one wheel cylinders that are supplied with working fluid and that gives braking force to a wheel; a wheel cylinder pressure control system that controls working fluid pressure of the wheel cylinder independently of brake operation of a driver; a manual hydraulic pressure source that includes a first hydraulic pressure source that pressurizes the working fluid contained in the first hydraulic pressure source, in accordance with amount of operation of a brake operating member performed by the driver, and a second hydraulic pressure source that adjusts pressure of the working fluid in agreement with the working fluid pressure of the first hydraulic pressure source; a first open-close valve provided on a first supply path that connects the first hydraulic pressure source and the at least one wheel cylinder; and a second open-close valve provided on a second supply path that connects the second hydraulic pressure source and the at least one wheel cylinder. In this brake control device, the first open-close valve is kept in a closed state despite a valve-opening command due to an effect of a differential pressure between an outlet opening and an inlet opening of the first open-close valve if the differential pressure is greater than a first predetermined pressure during the closed state of the first open-close valve while a wheel cylinder pressure of the at least one wheel cylinder is controlled at a pressure that is higher than the pressure of the manual hydraulic pressure source, and the second open-close valve is kept in the closed state despite the valve-opening command due to the effect of the differential pressure between an outlet opening and an inlet opening of the second open-close valve if the differential pressure is greater than a second predetermined pressure during the closed state of the second open-close valve while the wheel cylinder pressure is controlled at a pressure that is higher than the pressure of the manual hydraulic pressure source, and the second predetermined pressure is set smaller than a maximum value of the wheel cylinder pressure that is realized by the wheel cylinder pressure control system, and the first predetermined pressure is set larger than the maximum value.

According to still another aspect of the invention, a brake control method is provided. In this brake control method, when a shift to a brake mode for backup involving separation of a supply path of working fluid is performed at a time of detection of an abnormality during braking, a differential pressure acting between an outlet opening and an inlet opening of an open-close valve which is provided between a hydraulic pressure source that is used during the backup brake mode and wheel cylinders and which needs to be opened during the backup brake mode is lessened prior to the separation of the supply path of working fluid so that the open-close valve is opened in accordance with a valve-opening command while a pressure of the at least one wheel cylinder is kept higher than a minimum hydraulic pressure that generates braking force.

According to the brake control device and the brake control method of the invention, it becomes possible to avoid the confinement of wheel cylinder pressure.

BRIEF DESCRIPTION OF THE DRAWINGS

The features, advantages thereof, and technical and industrial significance of this invention will be better understood by reading the following detailed description of embodiments of the invention, when considered in connection with the accompanying drawings, in which.

DETAILED DESCRIPTION OF THE EMBODIMENTS

In the following description and the accompanying drawings, the present invention will be described in more detail with reference to exemplary embodiments.

Figure 1:
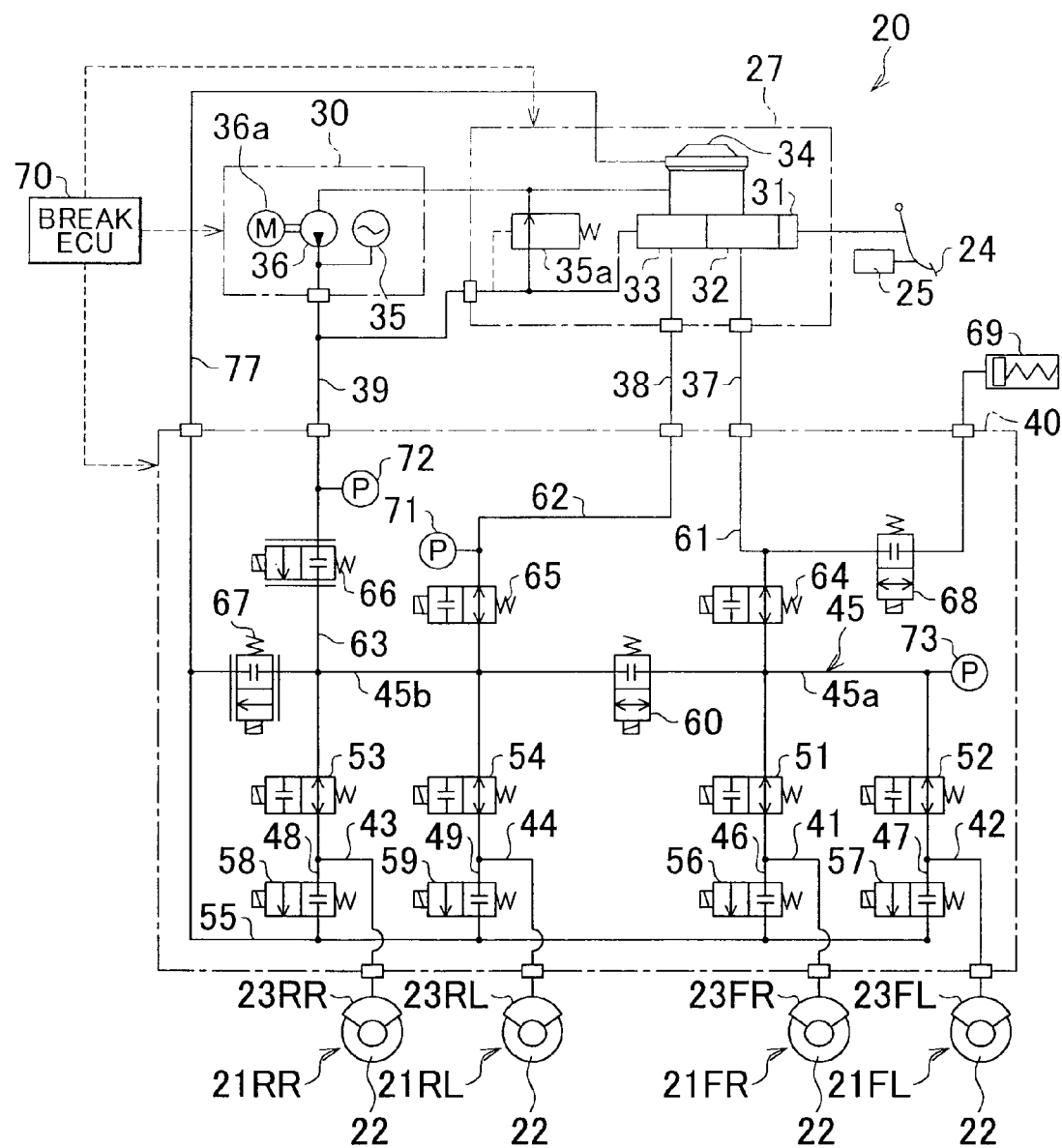
FIG. 1 is a system diagram showing a brake control device in accordance with a first embodiment of the invention.

FIG. 1 is a system diagram showing a brake control device 20 in accordance with a first embodiment of the invention. The brake control device 20 shown in FIG. 1 forms an electronic control brake system (ECB) for a vehicle, and controls braking forces applied to four wheels provided in the vehicle. The brake control device 20 in accordance with the embodiment is mounted, for example, in a hybrid vehicle that is equipped with an electric motor and an internal combustion engine as power sources for driving the vehicle. In such a hybrid vehicle, each of the regenerative braking of braking the vehicle by regenerating kinetic energy of the vehicle into electric energy, and the hydraulic braking by the brake control device 20 can be used for the braking of the vehicle. The vehicle in this embodiment is able to execute a brake regeneration coordinated control of generating a desired braking force through the combined use of the regenerative braking and the hydraulic pressure braking.

The brake control device 20, as shown in FIG. 1, includes disc brake units 21FR, 21FL, 21RR and 21RL provided corresponding respectively to the wheels, a master cylinder unit 27, a power hydraulic pressure source 30, and a hydraulic actuator 40.

The disc brake units 21FR, 21FL, 21RR and 21RL apply braking force to a right front wheel, a left front wheel, a right rear wheel and a left rear wheel of the vehicle, respectively. The master cylinder unit 27 as a manual hydraulic pressure source in this embodiment sends out brake fluid pressurized in accordance with the amount of the operation performed on a brake pedal 24 as a brake operating member by a driver, to the disc brake units 21FR to 21RL. The power hydraulic pressure source 30, in the case of sending out the brake fluid as a working fluid pressurized due to the supply of power, to the disc brake units 21FR to 21RL, is able to send out the brake fluid independently of the driver's operation of the brake pedal 24. The hydraulic pressure actuator 40 appropriately adjusts the hydraulic pressure of the brake fluid supplied from the power hydraulic pressure source 30 or the master cylinder unit 27, and sends it out to the disc brake units 21FR to 21RL. Thus, the braking force on each wheel provided by the hydraulic pressure braking is adjusted.

The disc brake units 21FR to 21RL, the master cylinder unit 27, the power hydraulic pressure source 30, and the hydraulic pressure actuator 40 will be individually described in detail below. Each of the disc brake units 21FR to 21RL includes a brake disc 22, and a wheel cylinder 23FR to 23RL that is built in a brake caliper. The wheel cylinders 23FR to 23RL are respectively connected to the hydraulic pressure actuator 40 via different fluid passageways. Hereinafter, the wheel cylinders 23FR to 23RL will be collectively referred to as "wheel cylinders 23", where appropriate.

In each disc brake unit 21FR to 21RL, when brake fluid is supplied from the hydraulic pressure actuator 40 to the wheel cylinder 23, a brake pad as a friction member is pressed against the brake disc 22 that rotates together with a corresponding one of the wheels. Thus, braking force is applied to each wheel. Although this embodiment uses the disc brake units 21FR to 21RL, it is also permissible to use other braking force applying mechanisms which each include a wheel cylinder 2, for example, a drum brake or the like.

The master cylinder unit 27 in this embodiment is a hydraulic pressure booster-equipped master cylinder, and includes a hydraulic pressure booster 31, a master cylinder 32, a regulator 33, and a reservoir 34. The hydraulic pressure booster 31 is linked to the brake pedal 24, and amplifies the pedal depressing force applied to the brake pedal 24, and transfers it to the master cylinder 32. The pedal depressing force is amplified as the brake fluid is supplied from the power hydraulic pressure source 30 to the hydraulic pressure booster 31 via the regulator 33. Then, the master cylinder 32 generates a master cylinder pressure that has a predetermined servo ratio with respect to the pedal depressing force.

The reservoir 34 that stores brake fluid is disposed on top of the master cylinder 32 and the regulator 33. The master cylinder 32 becomes connected in communication with the reservoir 34 when the brake pedal 24 is not depressed. On the other hand, the regulator 33 is connected in communication with both the reservoir 34 and an accumulator 35 of the power hydraulic pressure source 30. Using the reservoir 34 as a low pressure source and the accumulator 35 as a high pressure source, the regulator 33 generates a hydraulic pressure substantially equal to the master cylinder pressure. The hydraulic pressure of the regulator 33 will be referred to as "regulator pressure" below, where appropriate. Incidentally, the master cylinder pressure and the regulator pressure do not need to be made strictly the same pressure. For example, it is also possible to design the master cylinder unit 27 so that the regulator pressure becomes slightly higher.

The power hydraulic pressure source 30 includes the accumulator 35 and a pump 36. The accumulator 35 converts the pressure energy of the brake fluid pressurized by the pump 36 into the pressure energy of a filler gas, such as nitrogen or the like, for example, a pressure of about 14 to 22 MPa, and stores the converted pressure. The pump 36 has a motor 36a as a drive source. A suction opening of the pump 36 is connected to the reservoir 34 while the ejection opening thereof is connected to the accumulator 35. The accumulator 35 is also connected to a relief valve 35a that is provided in the master cylinder unit 27. If the pressure of the brake fluid in the accumulator 35 abnormally rises to, for example, about 25 MPa, the relief valve 35a opens, so that the high-pressure brake fluid returns to the reservoir 34.

As described above, the brake control device 20 has the master cylinder 32, the regulator 33 and the accumulator 35 as sources of supplying the brake fluid to the wheel cylinders 23. A master piping 37 is connected to the master cylinder 32. Likewise, a regulator piping 38 is connected to the regulator 33, and an accumulator piping 39 is connected to the accumulator 35. The master piping 37, the regulator piping 38 and the accumulator piping 39 are connected to the hydraulic pressure actuator 40.

The hydraulic pressure actuator 40 includes an actuator block in which a plurality of channels are formed, and a plurality of electromagnetic control valves. The channels formed in the actuator block include individual channels 41, 42, 43 and 44, and a main channel 45. The individual channels 41 to 44 branch from the main channel 45, and are connected to the wheel cylinders 23FR, 23FL, 23RR, 23RL of the disc brake units 21FR, 21FL, 21RR, 21RL, respectively. Thus, each wheel cylinder 23 is connectable in communication with the main channel 45.

An intermediate portion of each of the individual channels 41, 42, 43 and 44 is provided with an ABS retention valve 51, 52, 53 and 54. Each of the ABS retention valves 51 to 54 has a solenoid that is on/off controlled, and a spring, and is a normally open type electromagnetic control valve that is open when the solenoid is in a non-electrified state. Each ABS retention valve 51 to 54, when in the open state, allows the brake fluid to pass in either direction. That is, the brake fluid can be caused to flow from the main channel 45 to the wheel cylinders 23, and can also be caused to flow from the wheel cylinders 23 to the main channel 45. When an ABS retention valve 51 to 54 is closed by electrifying the solenoid thereof, the passage of brake fluid in a corresponding one of the individual channels 41 to 44 is shut off.

Furthermore, the wheel cylinders 23 are connected to a reservoir channel 55 via pressure reduction-purpose channels 46, 47, 48 and 49 that are connected to the individual channels 41 to 44, respectively. An intermediate portion of each of the pressure reduction-purpose channels 46, 47, 48 and 49 is provided with an ABS pressure-reducing valve 56, 57, 58 and 59. Each of the ABS pressure-reducing valves 56 to 59 has a solenoid that is on/off controlled, and a spring, and is a normally closed type electromagnetic valve that is closed while the solenoid is in a non-electrified state. When an ABS pressure-reducing valve 56 to 59 is in the closed state, the passage of brake fluid through a corresponding one of the pressure reduction-purpose channels 46 to 49 is shut off. When the ABS pressure-reducing valve 56 to 59 is opened by electrifying the solenoid thereof, the passage of brake fluid through the corresponding one of the pressure reduction-purpose channels 46 to 49 is permitted, so that the brake fluid returns from the corresponding one of the wheel cylinders 23 to the reservoir 34 via the pressure reduction-purpose channel 46 to 49 and the reservoir channel 55. Incidentally, the reservoir channel 55 is connected to the reservoir 34 of the master cylinder unit 27 via a reservoir piping 77.

An intermediate portion of the main channel 45 has a separation valve 60. By the separation valve 60, the main channel 45 is divided to a first channel 45a connected to the individual channels 41 and 42, and a second channel 45b connected to the individual channels 43 and 44. The first channel 45a is connected to the wheel cylinders 23FR and 23FL for the front wheels via the individual channels 41 and 42. The second channel 45b is connected to the wheel cylinders 23RR and 23RL for the rear wheels via the individual channels 43 and 44.

The separation valve 60 has a solenoid that is on/off controlled, and a spring, and is a normally closed type electromagnetic control valve that is closed when the solenoid is in a non-electrified state. When the separation valve 60 is in the closed state, the passage of brake fluid in the main channel 45 is shut off. When the separation valve 60 is opened by electrifying the solenoid thereof, brake fluid can be passed in either direction between the first channel 45a and the second channel 45b.

In the hydraulic pressure actuator 40, a master channel 61 and a regulator channel 62 connected in communication with the main channel 45 are formed. More specifically, the master channel 61 is connected to the first channel 45a of the main channel 45, and the regulator channel 62 is connected to the second channel 45b of the main channel 45. Furthermore, the master channel 61 is connected to the master piping 37 that is connected in communication with the master cylinder 32. The regulator channel 62 is connected to the regulator piping 38 that is connected in communication with the regulator 33.

An intermediate portion of the master channel 61 has a master cut-off valve 64. The master cut-off valve 64 is provided on a supply path of brake fluid from the master cylinder 32 to the wheel cylinders 23. The master cut-off valve 64 has a solenoid that is on/off controlled, and a spring, and is a normally open type electromagnetic control valve which is guaranteed to assume a closed state due to the electromagnetic force that the solenoid generates upon being supplied with a prescribed control current, and which is open when the solenoid is in the non-electrified state. The master cut-off valve 64, when in the open state, allows brake fluid to pass in either direction between the master cylinder 32 and the first channel 45a of the main channel 45. When the master cut-off valve 64 is closed by electrifying the solenoid with a prescribed control current, the passage of brake fluid in the master channel 61 is shut off.

A stroke simulator 69 is connected to the master channel 61 at the upstream side of the master cut-off valve 64, via a simulator cut-off valve 68. That is, the simulator cut-off valve 68 is provided in a channel that connects the master cylinder 32 and the stroke simulator 69. The simulator cut-off valve 68 has a solenoid that is on/off controlled, and a spring, and is a normally closed type electromagnetic control valve which is guaranteed to assume an open valve state due to the electromagnetic force that the solenoid generates upon being supplied with a prescribed control current, and which is closed when the solenoid is in the non-electrified state. When the simulator cut-off valve 68 is in the closed state, the passage of brake fluid between the master channel 61 and the stroke simulator 69 is shut off. When the simulator cut-off valve 68 is opened by electrifying the solenoid, the brake fluid can be passed in either direction between the master cylinder 32 and the stroke simulator 69.

The stroke simulator 69 includes pistons and springs, and sends out reaction force that is in accordance with the driver's depression force on the brake pedal 24 when the simulator cut-off valve 68 is open. As for the stroke simulator 69, it is preferable to adopt a stroke simulator that has a multi-stepped spring characteristic in order to improve the driver's brake operation feeling.

An intermediate portion of the regulator channel 62 has a regulator cut-off valve 65. The regulator cut-off valve 65 is provided on a supply path of brake fluid from the regulator 33 to the wheel cylinders 23. The regulator cut-off valve 65 also has a solenoid that is on/off controlled, and a spring, and is a normally open type electromagnetic control valve which is guaranteed to assume a closed valve state due to the electromagnetic force that the solenoid generates upon being supplied with a prescribed control current, and which is open when the solenoid is in the non-electrified state. The regulator cut-off valve 65, when in the open state, allows brake fluid to pass in either direction between the regulator 33 and the second channel 45b of the main channel 45. When the regulator cut-off valve 65 is closed by electrifying the solenoid, the passage of brake fluid in the regulator channel 62 is shut off.

In the hydraulic pressure actuator 40, an accumulator channel 63 is also formed in addition to the master channel 61 and the regulator channel 62. An end of the accumulator channel 63 is connected to the second channel 45b of the main channel 45, and another end thereof is connected to the accumulator piping 39 that is connected in communication with the accumulator 35.

An intermediate portion of the accumulator channel 63 has a pressure-increasing linear control valve 66. Furthermore, the accumulator channel 63, and the second channel 45b of the main channel 45 are connected to the reservoir channel 55 via a pressure-reducing linear control valve 67. Each of the pressure-increasing linear control valve 66 and the pressure-reducing linear control valve 67 has a linear solenoid, and a spring, and is a normally closed type electromagnetic control valve that is closed when the solenoid thereof is in the non-electrified state. In each of the pressure-increasing linear control valve 66 and the pressure-reducing linear control valve 67, the valve opening degree is adjusted in proportion to the electric current supplied to the solenoid thereof.

The pressure-increasing linear control valve 66 is provided as a common pressure-increasing control valve for shared use for the plurality of wheel cylinders 23 that are provided corresponding to the wheels. Likewise, the pressure-reducing linear control valve 67 is provided as a common pressure-reducing control valve for the wheel cylinders 23. That is, in this embodiment, the pressure-increasing linear control valve 66 and the pressure-reducing linear control valve 67 are provided as a pair of common control valves for the wheel cylinders 23 which control the supply and discharge of the working fluid sent out from the power hydraulic pressure source 30, with respect to the wheel cylinders 23. In the light of cost, the provision of the pressure-increasing linear control valve 66 and the like for shared use for the wheel cylinders 23 as described above is more preferable than a construction in which linear control valves are provided individually for the wheel cylinders 23.

Incidentally, the differential pressure between the outlet and inlet openings of the pressure-increasing linear control valve 66 corresponds to the pressure difference between the pressure of brake fluid in the accumulator 35 and the pressure of brake fluid in the main channel 45. The differential pressure between the outlet and inlet openings of the pressure-reducing linear control valve 67 corresponds to the pressure difference between the pressure of brake fluid in the main channel 45 and the pressure of brake fluid in the reservoir 34. Furthermore, a relationship of F1+F3=F2 holds where F1 is the electromagnetic drive force that is in accordance with the electric power supplied to the linear solenoid of the pressure-increasing linear control valve 66 or the pressure-reducing linear control valve 67, F2 is the elastic force of the spring thereof, and F3 is a differential pressure action force that is in accordance with the differential pressure between the outlet and inlet openings of the pressure-increasing linear control valve 66 or the pressure-reducing linear control valve 67. Therefore, by continuously controlling the electric powers supplied to the linear solenoids of the pressure-increasing linear control valve 66 and the pressure-reducing linear control valve 67, the differential pressures between the outlet and inlet openings of the pressure-increasing linear control valve 66 and the pressure-reducing linear control valve 67 can be controlled.

In the brake control device 20, the power hydraulic pressure source 30 and the hydraulic pressure actuator 40 are controlled by a brake ECU 70 that is provided as a control portion in this embodiment. The brake ECU 70 is constructed as a microprocessor that includes a CPU. Besides the CPU, the brake ECU 70 further includes a ROM that stores various programs, a RAM for temporarily storing data, input/output ports, communication ports, etc. The brake ECU 70 is capable of communicating with a hybrid ECU (not shown) that is superior thereto, and the like. On the basis of control signals from the hybrid ECU and signals from various sensors, the brake ECU 70 controls the pump 36 of the power hydraulic pressure source 30, and the electromagnetic control valves 51 to 54, 56 to 59, 60, 64 to 68 that constitute the hydraulic pressure actuator 40.

A regulator pressure sensor 71, an accumulator pressure sensor 72 and a control pressure sensor 73 are connected to the brake ECU 70. The regulator pressure sensor 71 detects the pressure of brake fluid in the regulator channel 62 on the upstream side of the regulator cut-off valve 65, that is, the regulator pressure, and gives a signal indicating the detected value, to the brake ECU 70. The accumulator pressure sensor 72 detects the pressure of brake fluid in the accumulator channel 63 on the upstream side of the pressure-increasing linear control valve 66, that is, the accumulator pressure, and gives a signal indicating the detected value, to the brake ECU 70. The control pressure sensor 73 detects the pressure of brake fluid in the first channel 45a of the main channel 45, and gives a signal indicating the detected value, to the brake ECU 70. The detected values of the pressure sensors 71 to 73 are sequentially given to the brake ECU 70 at predetermined time intervals, and are stored and retained in predetermined storage areas in the brake ECU 70, in a predetermined amount at a time.

In the case where the separation valve 60 is open and the first channel 45a and the second channel 45b of the main channel 45 are connected in communication with each other, the output value of the control pressure sensor 73 indicates the hydraulic pressure on the low-pressure side of the pressure-increasing linear control valve 66, and also indicates the hydraulic pressure on the high-pressure side of the pressure-reducing linear control valve 67. Therefore, the output value thereof can be used for the control of the pressure-increasing linear control valve 66 and the pressure-reducing linear control valve 67. In the case where the pressure-increasing linear control valve 66 and the pressure-reducing linear control valve 67 are closed and where the master cut-off valve 64 is in the open state, the output value of the control pressure sensor 73 indicates the master cylinder pressure. Furthermore, in the case where the separation valve 60 is open so that the first channel 45a and the second channel 45b of the main channel 45 are connected in communication with each other and where the ABS retention valves 51 to 54 are open while the ABS pressure-reducing valves 56 to 59 are closed, the output value of the control pressure sensor 73 indicates the working fluid pressure that acts on each wheel cylinder 23, that is, the wheel cylinder pressure.

Furthermore, the sensors connected to the brake ECU 70 also include a stroke sensor 25 that is provided for the brake pedal 24. The stroke sensor 25 detects the pedal stroke as the amount of operation of the brake pedal 24, and gives a signal indicating the detected value, to the brake ECU 70. The output value of the stroke sensor 25 is also sequentially given to the brake ECU 70 at predetermined time intervals, and is stored and retained in a predetermined area in the brake ECU 70 in a predetermined amount at a time. Brake operation state detector others than the stroke sensor 25 may also be provided and connected to the brake ECU 70, in addition to the stroke sensor 25 or in place of the stroke sensor 25. Examples of the brake operation state detector include a pedal depression force sensor that detects the operation force on the brake pedal 24, a brake switch that detects that the brake pedal 24 has been depressed, etc.

The brake control device 20 constructed as described above is able to execute the brake regeneration coordinated control. Upon receiving a braking request, the brake control device 20 starts braking. The braking request is generated when braking force needs to be applied to the vehicle, for example, when a driver operates the brake pedal 24.

Receiving the braking request, the brake ECU 70 calculates a requested braking force, and then calculates a requested hydraulic pressure braking force that is a braking force to be generated by the brake control device 20, by subtracting the braking force produced by the regeneration, from the requested braking force. The value of the braking force produced by the regeneration is supplied from the hybrid ECU to the brake control device 20. Then, on the basis of the requested hydraulic pressure braking force calculated as described above, the brake ECU 70 calculates a target hydraulic pressure for the wheel cylinders 23FR to 23RL. The brake ECU 70 determines the value of the control current to be supplied to the pressure-increasing linear control valve 66 and the pressure-reducing linear control valve 67 in accordance with a feedback control law so that the wheel cylinder pressure becomes equal to the target hydraulic pressure.

As a result, in the brake control device 20, brake fluid is supplied from the power hydraulic pressure source 30 to the wheel cylinders 23 via the pressure-increasing linear control valve 66, so that braking force is applied to the wheels. Brake fluid is discharged from the wheel cylinders 23 via the pressure-reducing linear control valve 67 in accordance with need so as to adjust the braking force applied to the wheels. In this embodiment, the power hydraulic pressure source 30, the pressure-increasing linear control valve 66, the pressure-reducing linear control valve 67, etc., constitute a wheel cylinder pressure control system. By the wheel cylinder pressure control system, a so-called brake-by-wire braking force control is performed. The wheel cylinder pressure control system is provided in parallel with the supply path of brake fluid from the master cylinder unit 27 to the wheel cylinders 23.

At this time, the brake ECU 70 causes the regulator cut-off valve 65 to be in the closed state, so that the brake fluid sent out from the regulator 33 is not supplied to the main channel 45. Furthermore, the brake ECU 70 causes the master cut-off valve 64 to be in the closed state, and the simulator cut-off valve 68 to be in the open state. This operation is performed in order that the brake fluid sent out from the master cylinder 32 in association with the operation of the brake pedal 24 performed by the driver will be supplied to the stroke simulator 69, not to the wheel cylinders 23. During the brake regeneration coordinated control, a differential pressure corresponding in magnitude to the regenerative braking force acts between the upstream and downstream sides of the regulator cut-off valve 65 and also between the master cut-off valve 64.

In the brake control device 20 in accordance with this embodiment, it should be apparent that the braking force can be controlled by the wheel cylinder pressure control system also when the regenerative braking force is not utilized but the hydraulic braking force alone is used to realize the requested braking force. The control mode in which the braking force is controlled by the wheel cylinder pressure control system will hereinafter be termed "linear control mode" as appropriate, regardless of whether or not the brake regeneration coordinated control is executed during the control mode. This control mode will sometimes be also referred to as "the brake-by-wire control".

During the linear control mode, operations other than the operation of causing the generation of the driver's requested braking force are also sometimes executed; for example, the so-called VSC (Vehicle Stability Control), the TRC (Traction Control), etc. for stabilizing the behavior of the vehicle by restraining the slip of each wheel with respect to the road surface, are executed. The VSC control is a control for restraining skid or sideslip of the wheels during the turning of the vehicle. The TRC control is a control for restraining the spinning of the drive wheels at the time of start or acceleration of the vehicle. Besides, a brake assistance control that heightens the braking force by supplementing the braking force input by the driver at the time of emergency braking is also sometimes executed during the linear control mode.

During the control in the linear control mode, the wheel cylinder pressure sometimes deviates from the target hydraulic pressure due to occurrence of an abnormality, for example, a failure or the like. The brake ECU 70 periodically determines the presence/absence of a response abnormality regarding the wheel cylinder pressure, for example, on the basis of the value measured by the control pressure sensor 73. When it is determined that there is an abnormality in the control response of the wheel cylinder pressure, the brake ECU 70 discontinues the linear control mode, and switches the control mode to the manual brake mode. In the manual brake mode, the force input to the brake pedal 24 by the driver is converted into a hydraulic pressure, and is mechanically transferred to the wheel cylinders 23, so that braking force is given to the wheels. From a fail-safe viewpoint, the manual brake mode also serves as a backup control mode for the linear control mode.

The brake ECU 70 can select one of a plurality of modes as a manual brake mode by varying the hydraulic pressure source for use and the brake fluid supply path from the hydraulic pressure source to the wheel cylinders 23. In this embodiment, the shift to a non-control mode, as an example, will be described. During the non-control mode, the brake ECU 70 stops the supply of control current to all the electromagnetic control valves. Therefore, the master cut-off valve 64 and the regulator cut-off valve 65, which are of the normally open type, are opened, and the separation valve 60 and the simulator cut-off valve 68, which are of the normally closed type, are closed. The pressure-increasing linear control valve 66 and the pressure-reducing linear control valve 67 stop being controlled, and are closed.

In consequence, the supply path of brake fluid is separated into two systems, that is, the master cylinder side, and the regulator side. The master cylinder pressure is transferred to the wheel cylinders 23FR, 23FL for the front wheels, and the regulator pressure is transferred to the wheel cylinders 23RR, 23RL for the rear wheels. The destination element to which working fluid is sent out is switched from the stroke simulator 69 to the wheel cylinders 23FR, 23FL for the front wheels (which means that the switching is performed so that the output of working fluid to the stroke simulator 69 is shut off, and working fluid is output to the wheel cylinders 23FR, 23FL for the front wheels). According to the non-control mode, braking force can be generated even when the electrification of an electromagnetic control valve does not occur due to an abnormality in the control system, which is preferable from a fail-safe viewpoint. In this embodiment, the master cylinder 32 and the regulator 33 correspond to a first hydraulic source and a second hydraulic source, respectively, and the master cut-off valve 64 and the regulator cut-off valve 65 correspond to a first open-close valve and a second open-close valve, respectively.

In this embodiment, it sometimes happens that the wheel cylinder pressure is controlled to a higher pressure than the pressure of the manual hydraulic pressure source that pressurizes the working fluid contained therein in accordance with the amount of the driver's operation of the brake operating member. The control of the wheel cylinder pressure to a high pressure in this manner is considered to occur, for example, during execution of the aforementioned VSC control or the brake assist control. Specifically, during the VSC control or the brake assist control, the aforementioned control is assumed to occur in the case where the driver's depression force on the brake pedal 24 is relatively small since in that case the hydraulic pressure in the manual hydraulic pressure source is relatively low.

During such a high-pressure control, it sometimes happens that the control shifts from the brake-by-wire control to a backup-purpose brake mode during braking, for example, because an abnormality is detected at an arbitrary site in the brake control device 20. In order to make possible the supply of working fluid from the manual hydraulic pressure source at the time of shift to the backup brake mode, a valve-opening command is sent to an open-close valve provided in an intermediate portion of a channel that connects the manual hydraulic pressure source and the wheel cylinders. If the differential pressure between the outlet and inlet openings of the open-close valve is greater than a predetermined pressure, the closed state of the valve is maintained due to the effect of the differential pressure despite the valve-opening command. This predetermined pressure will be hereinafter termed the self-closure-release pressure as appropriate. If this open-close valve is not opened, there is possibility of high pressure being confined in the wheel cylinders 23 downstream of the open-close valve. When the confinement of wheel cylinder pressure occurs, the corresponding wheels are caused to have drags.

Concretely, there is possibility of hydraulic pressure being confined in the wheel cylinders 23RR, 23RL for the rear wheels which are downstream of the regulator cut-off valve 65, when the mode shifts to the non-control mode. In a normally open type electromagnetic control valve, such as the regulator cut-off valve 65, if during the on-state of the valve, that is, the closed state, a hydraulic pressure that is greater than the self-closure-release pressure of the valve is acting between the outlet and inlet openings of the control valve in such a direction as to close the control valve, the control valve cannot return to the open state when the electrification of the valve is stopped in accordance with the valve-opening command. This is because the self-closure-release pressure of a control valve is set as being the maximum value of the differential pressure between the outlet and inlet openings of the control valve which allows the control valve to be returned to the open state by the valve opening force of the built-in return spring of the control valve. Incidentally, in this embodiment, the differential pressure acts in such a direction as to close the control valve when the pressure of the wheel cylinders 23, which are on the downstream side, is higher than the pressure of the regulator 33, which is at the upstream side. Hereinafter, this direction will sometimes be referred to as "self closure direction", as appropriate.

In this embodiment, the self-closure-release pressure of the regulator cut-off valve 65 is set relatively low and, in particular, lower than the maximum value of the wheel cylinder pressure that is realized by the wheel cylinder pressure control system, and therefore there is a tendency to more likely occurrence of the confinement of hydraulic pressure. The maximum value of the wheel cylinder pressure that is realized by the wheel cylinder pressure control system (hereinafter, referred to as "maximum wheel cylinder pressure", as appropriate) is, for example, the hydraulic pressure that is realized when the pressure-increasing linear control valve 66 is fully opened while the accumulator pressure is equal to a maximum pressure that is storable. The wheel cylinder pressure is sometimes controlled to the maximum pressure during the control in the linear control mode. Furthermore, the wheel cylinder pressure sometimes reaches the maximum value also in the case of an open failure of the pressure-increasing linear control valve 66 or a closed failure of the separation valve 60.

The self-closure-release pressure of the regulator cut-off valve 65 is set relatively low mainly for the following two reasons. One reason is that the setting of the self-closure-release pressure of the regulator cut-off valve 65 at a low value can realize a size reduction of the regulator cut-off valve 65 and therefore a size reduction of the brake control device 20. The other reason is that the setting of the self-closure-release pressure of the regulator cut-off valve 65 at a low value can sufficiently secure a good performance in introducing hydraulic pressure from the regulator 33. The performance in introducing hydraulic pressure from the regulator 33 to the wheel cylinders 23 can be improved merely by increasing the hole diameter in the valve structure of the regulator cut-off valve 65. This, however, reduces the self-closure-release pressure of the valve 65. Incidentally, the securement of good performance in introducing hydraulic pressure from the regulator 33 is taken into consideration, for the purpose of, for example, heightening the braking performance by using the hydraulic pressure introduced from the regulator 33 as an assistance to the wheel cylinder pressure control system at the time of sudden braking or the like.

Furthermore, during the non-control mode, unless the master cut-off valve 64 is opened, brake fluid cannot be supplied from the master cylinder 32 to the wheel cylinders 23FR, 23FL for the front wheels. If the securement of a braking force on the front wheels is considered important, the self-closure-release pressure of the master cut-off valve 64 is preferably set higher than the maximum wheel cylinder pressure. Therefore, the master cut-off valve 64 will not be impeded from opening by the differential pressure that acts between the outlet and inlet openings of the valve 64, but can be opened any time in accordance with the valve-opening command.

In short, in this embodiment, during the linear control mode, the differential pressure acting in the self closure direction between the outlet and inlet openings of the regulator cut-off valve 65 sometimes exceeds the self-closure-release pressure thereof. In such cases, the control mode can sometimes be shifted to the non-control mode. In this embodiment, the self-closure-release pressure of the regulator cut-off valve 65 is set smaller than the maximum wheel cylinder pressure, and the self-closure-release pressure of the master cut-off valve 64 is set larger than the maximum wheel cylinder pressure.

It is desirable that the switching of the control mode and, particularly, the shift to the backup brake mode at the time of occurrence of an abnormality be basically performed immediately at the time of occurrence of the abnormality. To that end, in the case of a shift to the non-control mode, it is considered to be desirable that the master cut-off valve 64, the regulator cut-off valve 65 and the separation valve 60 be stopped from being electrified simultaneously and that the opening of the master cut-off valve 64 and the regulator cut-off valve 65 and the closure of the separation valve 60 be simultaneously performed. Simultaneously with this, the electrification of the pressure-increasing linear control valve 66 and the pressure-reducing linear control valve 67 is also stopped, and the control by the wheel cylinder pressure control system is discontinued. Thus, the shift to the non-control mode is completed. At this time, if the master cut-off valve 64 and the regulator cut-off valve 65 are each opened at the instant of the stop of the electrification, the front wheel-side surplus hydraulic pressure is released to the master cylinder 32 via the master cut-off valve 64, and the rear wheel-side surplus hydraulic pressure is released to the regulator 33 via the regulator cut-off valve 65.

However, in the case where the wheel cylinder pressure has been set high as mentioned above, the regulator cut-off valve 65 may remain in the closed state even after the electrification thereof is stopped, and thus there is possibility of a hydraulic pressure being confined in the wheel cylinders 23RR, 23RL for the rear wheels.

In this embodiment, when the mode shifts to the backup brake mode, the brake ECU 70 controls the discharge paths of brake fluid from the wheel cylinders 23 so that the differential pressure acting in the self-closure direction between the outlet and inlet openings of each open-close valve becomes smaller than the self-closure-release pressure of the valve and therefore the open-close valve will be opened in accordance with the valve-opening command. In this case, the brake ECU 70 makes the timings of the open-close operation commands to the open-close valves, in particular, the master cut-off valve 64 and the separation valve 60, different from each other. The brake ECU 70 also makes the timings of the open/close operation commands to the regulator cut-off valve 65 and the separation valve 60 different from each other. Herein, it suffices that the valve-opening commands to the master cut-off valve 64 and the regulator cut-off valve 65, which are of the normally open type control valves, be the stop of electrification of each control valve, and it also suffices that the valve-closing command to the separation valve 60, which is of the normally closed type control valve, be the stop of electrification of the control valve.

Concretely, at the time of the shift to the non-control mode, the brake ECU 70 stops the electrification of the regulator cut-off valve 65 and the master cut-off valve 64 prior to the electrification of the separation valve 60. During the period from the opening of the master cut-off valve 64 to the closure of the separation valve 60, the master cut-off valve 64 and the separation valve 60 are both in the open state. Therefore, via the separation valve 60 and the master cut-off valve 64, the brake fluid returns from the wheel cylinders 23 to the master cylinder 32, so that the differential pressure between the outlet and inlet openings of the regulator cut-off valve 65 is reduced. After the differential pressure acting on the regulator cut-off valve 65 becomes smaller than the self-closure-release pressure thereof, the brake ECU 70 closes the separation valve 60. The regulator cut-off valve 65 naturally opens when the differential pressure thereon becomes smaller than the self-closure-release pressure thereof.

Figure 2:
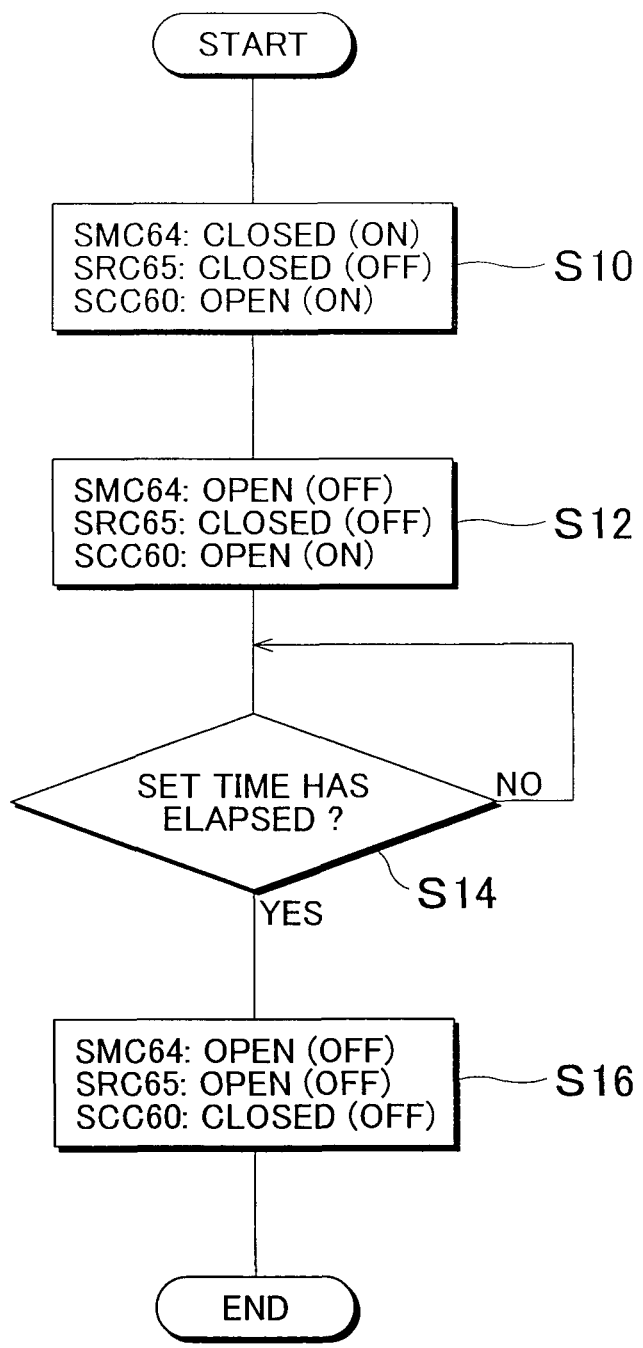
FIG. 2 is a flowchart for describing an example of a process of shifting to a backup brake mode in accordance with the first embodiment.

With reference to FIG. 2, a control mode shift process in accordance with the first embodiment of the invention will be further described in detail. FIG. 2 is a flowchart for describing an example of the process of shifting to the backup brake mode in accordance with the first embodiment. The process shown in FIG. 2 is executed by the brake ECU 70 at the time of shift to the non-control mode. The process will be described with an example in which an abnormality is detected during execution of the linear control mode, and then the mode is shifted to the non-control mode. The following description will be made on the assumption of a situation in which the wheel cylinder pressure has been made high and the differential pressure acting in the self-closure direction between the outlet and inlet openings of the regulator cut-off valve 65 is greater than the self-closure-release pressure thereof. In addition, in the drawing, the master cut-off valve 64, the regulator cut-off valve 65 and the separation valve 60 are represented by SMC64, SRC65 and SCC60, respectively.

When the process shown in FIG. 2 is to be started, the linear control mode is being executed. Therefore, the master cut-off valve 64, the regulator cut-off valve 65 and the separation valve 60 are each in the on-state in which the valves are being supplied with their respective prescribed control currents, and the master cut-off valve 64 and the regulator cut-off valve 65 are in the closed state, and the separation valve 60 is in the open state. The process shown in FIG. 2 is started when the linear control mode needs to be discontinued due to detection of an abnormality or the like. When the process shown in FIG. 2 starts, the brake ECU 70 firstly stops the electrification of the regulator cut-off valve 65 and thus causes the valve 65 to be in the off-state (S10). As a result, since the differential pressure between the outlet and inlet openings of the regulator cut-off valve 65 is greater than the self-closure-release pressure thereof, the regulator cut-off valve 65 does not open but remains in the closed state although the regulator cut-off valve 65 is intended to open by stopping the electrification thereof. At this time, the brake ECU 70 continues the electrification of the master cut-off valve 64 and the separation valve 60 to maintain the on-state thereof. Therefore, the master cut-off valve 64 is kept in the closed state, and the separation valve 60 is kept in the open state.

Subsequently, the brake ECU 70 stops the electrification of the master cut-off valve 64 to cause the valve 64 to be in the off-state, so that the master cut-off valve 64 opens (S12). In this embodiment, the self-closure-release pressure of the master cut-off valve 64 is set larger than the maximum wheel cylinder pressure, the stop of the electrification of the master cut-off valve 64 is immediately followed by the opening of the master cut-off valve 64 due to the elastic force of the return spring. In this stage, too, the brake ECU 70 continues the electrification of the separation valve 60 to maintain the open state thereof. Therefore, the wheel cylinders 23FR, 23FL for the front wheels are connected in communication to the master cylinder 32 via the master cut-off valve 64, so that the front wheel-side surplus hydraulic pressure is released to the master cylinder 32 via the master cut-off valve 64. The rear wheel-side surplus hydraulic pressure is released to the master cylinder 32 via the separation valve 60 and the master cut-off valve 64. Due to this, the pressure on the wheel cylinder side of the regulator cut-off valve 65 is reduced, and the differential pressure between the outlet and inlet openings of the regulator cut-off valve 65 is lessened.

Thus, it is desirable that the brake ECU 70 send the valve-opening command to the regulator cut-off valve 65 prior to the master cut-off valve 64. In the case of the shift to the non-control mode, a case is assumed in which the differential pressure between the outlet and inlet openings of the regulator cut-off valve 65 is smaller than the self-closure-release pressure thereof, so that the regulator cut-off valve 65 can be readily opened in accordance with the valve-opening command. In this case, if the valve-opening command is sent to the regulator cut-off valve 65 prior to the master cut-off valve 64, the surplus hydraulic pressure of the wheel cylinders 23 can be released to the regulator 33. Unlike the master cylinder 32, the regulator 33 is not directly connected to the brake pedal 24. Therefore, the pedal shock to the driver can be reduced by releasing the surplus hydraulic pressure to the regulator 33 with priority given thereto. In this case, the time lag between the valve-opening commands to the regulator cut-off valve 65 and to the master cut-off valve 64 may be set as being a predetermined time for releasing the surplus hydraulic pressure of the wheel cylinders 23 to the regulator 33 via the regulator cut-off valve 65. Or, the brake ECU 70 may also determine the valve-opening timing of the master cut-off valve 64 on the basis of the value measured by the control pressure sensor 73.

Referring back to FIG. 2, the brake ECU 70 determines whether or not a set time for lessening the differential pressure has elapsed (S14). This is preferable in that the simple control of determining the elapse of time allows the shift process to be executed, and is also preferable in that the shift process can be carried out even in the case where the pressure sensor has an abnormality. As for the set time for lessening the differential pressure, a time that is expected to be needed in order to lessen the differential pressure is appropriately set beforehand through experiments or the like and is stored in the brake ECU 70. This set time for lessening the differential pressure may be set, for example, at a predetermined time for making the differential pressure between the outlet and inlet openings of the regulator cut-off valve 65 smaller than the self-closure-release pressure thereof when the wheel cylinder pressure is equal to the maximum wheel cylinder pressure. This manner of establishing the set time on the assumption of a case where the largest amount of time is required for lessening the differential pressure is preferable in that the regulator cut-off valve 65 is reliably caused to open so as to avoid the confinement of hydraulic pressure.

The brake ECU 70 does not proceed to the next process but wait while it is not determined that the set time for lessening the differential pressure has elapsed (NO in S14). When it is determined that the set time for lessening the differential pressure has elapsed (YES in S14), the brake ECU 70 stops the electrification of the separation valve 60 to cause the valve 60 to be in the off-state, so that the separation valve 60 closes (S16). At this time, it is highly likely that the differential pressure between the outlet and inlet openings of the regulator cut-off valve 65 has become smaller than the self-closure-release pressure thereof; therefore, the regulator cut-off valve 65 naturally opens due to the elastic force of the return spring. In this way, the master cut-off valve 64, the regulator cut-off valve 65 and the separation valve 60 are sequentially caused to be in the off-state so as to separate the system into two systems, that is, the system on the master cylinder 32 side, and the system on the regulator 33 side. Thus, the shift to the non-control mode is completed. With regard to the pressure-increasing linear control valve 66 and the pressure-reducing linear control valve 67, too, the brake ECU 70 discontinues the electrification of the valves 66, 67 before closing the separation valve 60.

Although in the foregoing embodiment, the separation valve 60 is closed on condition that the set time for lessening the differential pressure has elapsed, it is also permissible, as a modification, that the brake ECU 70 closes the separation valve 60 on the basis of a measured value of the hydraulic pressure. For example, the brake ECU 70 may determine whether or not the differential pressure between the outlet and inlet openings of the regulator cut-off valve 65 is smaller than the self-closure-release pressure thereof, and if it is determined that the differential pressure has become smaller than the self-closure-release pressure, the brake ECU 70 may close the separation valve 60. Also preferably, the separation valve 60 may be closed when it is determined that the differential pressure between the outlet and inlet openings of the regulator cut-off valve 65 has reached a set hydraulic pressure that is sufficiently smaller than the self-closure-release pressure thereof. The differential pressure between the outlet and inlet openings of the regulator cut-off valve 65 can be found, for example, from a difference between the value measured by the regulator pressure sensor 71 and the value measured by the control pressure sensor 73. Thus, if the hydraulic pressure is actually monitored, the separation valve 60 can be closed to complete the shift to the non-control mode immediately at the time point when the differential pressure between the outlet and inlet openings of the regulator cut-off valve 65 becomes smaller than the self-closure-release pressure thereof. Therefore, this modification is preferable in being able to more quickly shift the control mode.

Incidentally, the brake ECU 70 may send the valve-opening command to the regulator cut-off valve 65 before the differential pressure between the outlet and inlet openings of the regulator cut-off valve 65 becomes smaller than the self-closure-release pressure thereof, and conversely, may also send the valve-opening command to the regulator cut-off valve 65 after the differential pressure between the outlet and inlet openings of the regulator cut-off valve 65 has become smaller than the self-closure-release pressure thereof. In the case where the brake ECU 70 sends the valve-opening command after the differential pressure between the outlet and inlet openings of the regulator cut-off valve 65 has become smaller than the self-closure-release pressure thereof, the regulator cut-off valve 65 is immediately opened in accordance with the valve-opening command. Besides, from a viewpoint of promptly performing the mode shift, it is preferable to send the valve-opening command to the regulator cut-off valve 65 before the separation valve 60 is closed. However, the brake ECU 70 may instead send the valve-opening command to the regulator cut-off valve 65 after the separation valve 60 is closed.

Although in the foregoing embodiment, the brake ECU 70 performs such a control as to make the open/close timings of the master cut-off valve 64, the regulator cut-off valve 65 and the separation valve 60 different from each other, it is also possible to make the open/close timings different without depending on the control by the brake ECU 70. For example, by setting a lowest hold current of each control valve beforehand in accordance with the open/close timing, a desired open/close timing can be realized even in the case where the control valves are simultaneously stopped being electrified, for example, at the time of a failure in the electric power source system, an abnormality of the brake ECU 70, etc. The lowest hold current refers to a value of electric current that is provided at the time of switch of a control valve to the non-electrified-time open or closed state during a transitional state following the stop of the supply of the control current to the control valve. That is, when the control current supplied to a control valve declines to be lower than the lowest hold current the control valve during the transitional state immediately following the stop of the electrification thereof, the control valve is returned to the non-electrified open/closed state. Specifically, when the control current becomes less than the lowest hold current, the control valve that is of the normally open type is returned to the open state, and the control valve that is of the normally closed type is returned to the closed state.

To realize the open/close timing in accordance with this embodiment, it suffices that the lowest hold currents of the master cut-off valve 64, the regulator cut-off valve 65 and the separation valve 60 be set beforehand so that the separation valve 60 switches to the non-electrified open/closed state the last of these valves, that is, later than the master cut-off valve 64 and the regulator cut-off valve 65. Preferably, the lowest hold currents of these control valves may be set beforehand so that the open/closed states of the control valves be switched in the order of the regulator cut-off valve 65, the master cut-off valve 64 and the separation valve 60. The lowest hold current of each control valve can be set at a desired value, for example, by appropriately adjusting the set load of the return spring provided in each control valve, the number of turns of the coil winding, and the magnetic circuit.

Furthermore, the lowest hold current of a control valve whose switching timing is desired to be more retarded may be set smaller, or the difference between the lowest hold current and the control current during the on-state of a control valve whose switching timing is desired to be more retarded may be set larger. Besides, the electric current time constant at the current-off time or the inductance of the coil of a control valve whose switching timing is desired to be more retarded may be set larger. The coil resistance of a control valve whose switching timing is desired to be more retarded may be set smaller. The internal resistance of a flywheel diode for coil protection or the equivalent resistance of a flywheel circuit of a control valve whose switching timing is desired to be more retarded may be set smaller.

As described above, according to the first embodiment, the brake fluid discharge path from the wheel cylinders 23 is controlled so that the differential pressure between the outlet and inlet openings of the regulator cut-off valve 65 is made smaller than the self-closure-release pressure thereof and therefore the regulator cut-off valve 65 can be opened in accordance with the valve-opening command. Concretely, by sequentially closing or opening the regulator cut-off valve 65, the master cut-off valve 64 and the separation valve 60, the surplus hydraulic pressure of the wheel cylinders 23 is returned to the master cylinder 32 via the master cut-off valve 64. Therefore, the shift to the backup brake mode can be smoothly completed while the confinement of wheel cylinder pressure is avoided.

Incidentally, in the first embodiment, the surplus hydraulic pressure can be returned to the master cylinder 32 even in the case where the regulator cut-off valve 65 has a closed failure and therefore the regulator cut-off valve 65 cannot be opened. Therefore, even if the regulator cut-off valve 65 has a closed failure, the confinement of wheel cylinder pressure in the regulator 33-side wheel cylinders 23RR, 23RL can be prevented.

Furthermore, in this embodiment, since the surplus hydraulic pressure of the wheel cylinders 23 is released to the master cylinder 32, the wheel cylinder pressure is reduced only to the master cylinder pressure at the lowest. As long as the master cylinder pressure is appropriately given by the driver's brake operation, the wheel cylinder pressure will not be remarkably reduced beyond the minimum braking hydraulic pressure that can give braking force to the wheel, for example, down to about the atmospheric pressure. Therefore, this embodiment is also preferable in being able to smoothly complete the shift to the brake mode for backup during braking while suitably achieving both the restraint of the drop in the vehicle deceleration, that is, the so-called deceleration declination phenomenon, and the avoidance of the confinement of wheel cylinder pressure.

Figure 3:
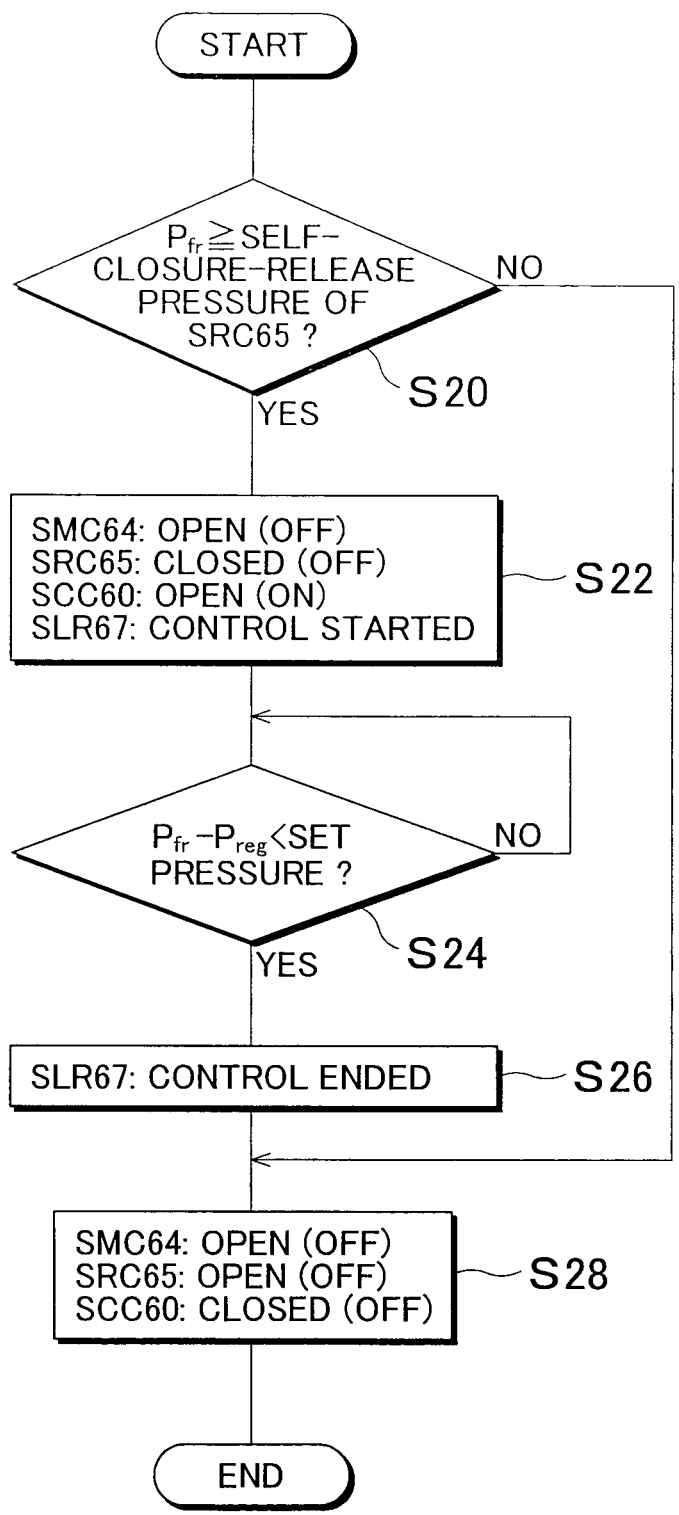
FIG. 3 is a flowchart for describing an example of the process of shifting to the backup brake mode in accordance with a second embodiment of the invention.

Next, with reference to FIG. 3, a process of shifting the control mode in accordance with a second embodiment of the invention will be described in detail. FIG. 3 is a flowchart for describing an example of the process of shifting to the backup brake mode in accordance with the second embodiment. The second embodiment is different from the first embodiment in that a pressure-reducing control via the pressure-reducing linear control valve 67 is used as well to remove the surplus hydraulic pressure of the wheel cylinders 23. In the flowchart, the master cut-off valve 64, the regulator cut-off valve 65, the separation valve 60 and the pressure-reducing linear control valve 67 are represented by SMC64, SRC65, SCC60 and SLR67, respectively, for the sake of convenience. Furthermore, in the flowchart, the wheel cylinder pressure is represented by Pfr, and the regulator pressure by Preg. In the following description of the second embodiment, the description of the same portions or the like as those in the first embodiment will be omitted as appropriate.

When the process shown in FIG. 3 starts, the brake ECU 70 firstly determines whether or not the wheel cylinder pressure Pfr is greater than or equal to the self-closure-release pressure of the regulator cut-off valve 65 (S20). The wheel cylinder pressure Pfr is acquired as a value measured by the control pressure sensor 73. If it is determined that the wheel cylinder pressure Pfr is less than the self-closure-release pressure of the regulator cut-off valve 65 (NO in S20), the brake ECU 70 immediately turns off the master cut-off valve 64, the regulator cut-off valve 65 and the separation valve 60 to complete the shift to the non-control mode (S28). In the case where the wheel cylinder pressure Pfr is less than the self-closure-release pressure of the regulator cut-off valve 65, the regulator cut-off valve 65 can be immediately opened upon the stop of electrification, without being impeded by the differential pressure.

Incidentally, in this wheel cylinder pressure determination process S20, the brake ECU 70 may, of course, determines whether or not the differential pressure between the wheel cylinder pressure Pfr and the regulator pressure Preg is greater than the self-closure-release pressure of the regulator cut-off valve 65. The regulator pressure Preg is acquired as a value measured by the regulator pressure sensor 71. A reason for determining whether or not the wheel cylinder pressure Pfr is greater than or equal to the self-closure-release pressure of the regulator cut-off valve 65 as described above is that determination at a safer side is intended in terms of fail-safe design. When the wheel cylinder pressure Pfr is smaller than the self-closure-release pressure of the regulator cut-off valve 65, the regulator cut-off valve 65 can be opened even if the driver's depression force is zero, that is, even if the regulator pressure is zero.

If it is determined that the wheel cylinder pressure Pfr is greater than or equal to the self-closure-release pressure of the regulator cut-off valve 65 (YES in S20), the brake ECU 70 stops the electrification of the master cut-off valve 64 and the regulator cut-off valve 65 to cause the valves to be in the off-state, and also starts the pressure-reducing control via the pressure-reducing linear control valve 67 (S22). In this embodiment, as in the first embodiment, the self-closure-release pressure of the regulator cut-off valve 65 is set smaller than the maximum wheel cylinder pressure, and the self-closure-release pressure of the master cut-off valve 64 is set larger than the maximum wheel cylinder pressure. Therefore, at this stage, the regulator cut-off valve 65 does not open but remains in the closed state due to the high wheel cylinder pressure Pfr although the regulator cut-off valve 65 is intended to open by stopping the electrification thereof. However, the master cut-off valve 64 is opened. Besides, the brake ECU 70 keeps the separation valve 60 in the on-state, so that the separation valve 60 continues being in the open state. Incidentally, instead of simultaneously stopping the master cut-off valve 64 and the regulator cut-off valve 65 from being electrified, the regulator cut-off valve 65 may be stopped being electrified prior to the master cut-off valve 64 as in the first embodiment. Or, the stop of electrification of the master cut-off valve 64 does need to be performed at the time of start of the pressure-reducing control, but may also be performed at any appropriate timing before the separation valve 60 is closed.

Since the separation valve 60 is in the open state, the wheel cylinders 23 for the front wheels and the rear wheels are connected in communication to the reservoir 34 via the pressure-reducing linear control valve 67 to release the surplus hydraulic pressure from the wheel cylinders 23, substantially simultaneously with the start of the pressure-reducing control. Therefore, the pressure on the wheel cylinder side of the regulator cut-off valve 65 is reduced, so that the differential pressure between the outlet and inlet openings of the regulator cut-off valve 65 is lessened.

After the pressure-reducing control by the pressure-reducing linear control valve 67 starts, the brake ECU 70 determines whether or not the differential pressure between the outlet and inlet openings of the regulator cut-off valve 65 is smaller than a predetermined set pressure (S24). The differential pressure between the outlet and inlet openings of the regulator cut-off valve 65 is computed as a difference between the wheel cylinder pressure Pfr and the regulator pressure Preg. The predetermined set pressure herein can be set as appropriate at a hydraulic pressure that is sufficiently smaller than the self-closure-release pressure of the regulator cut-off valve 65. For example, the predetermined set pressure may be set by subtracting the hydraulic pressure allowed for the measurement error of the pressure sensor, as a margin, from the self-closure-release pressure of the valve 65.

The brake ECU 70 does not proceed to the next step but wait while it is not determined that the differential pressure between the outlet and inlet openings of the regulator cut-off valve 65 is smaller than the predetermined set pressure (NO in S24). When it is determined that the differential pressure between the outlet and inlet openings of the regulator cut-off valve 65 is smaller than the predetermined set pressure (YES in S24), the brake ECU 70 ends the pressure-reducing control performed by the pressure-reducing linear control valve 67 (S26). Subsequently, the brake ECU 70 stops the electrification of the separation valve 60 and thus causes the valve to be in the off-state, so that the separation valve 60 is closed (S28). In this manner, the shift to the non-control mode is completed.

Although in the foregoing description of the control mode shifting process it is assumed that the wheel cylinder pressure Pfr and the regulator pressure Preg are measured in a normal fashion, the pressure-reducing control can also be performed even in the case where effective measurement values thereof can not be obtained. In the case where effective measured values of the wheel cylinder pressure Pfr and the regulator pressure Preg cannot be obtained, for example, the case where an abnormality is detected in a pressure sensor, or the case where effective measured values thereof cannot be obtained temporarily due to the influence of noise or the like, the brake ECU 70 may control the pressure-reducing linear control valve 67 so as to reduce the pressure for a certain time. In this case, the brake ECU 70, substantially simultaneously with stopping the electrification of the regulator cut-off valve 65, supplies a control current to the pressure-reducing linear control valve 67 for a pre-set electrification time. The electrification time of the pressure-reducing linear control valve 67 is set beforehand through experiments or the like at an appropriate amount of time that is expected to be needed in order to sufficiently lessen the differential pressure of the regulator cut-off valve 65, and is pre-stored in the brake ECU 70. At the elapse of the electrification time of the pressure-reducing linear control valve 67, the brake ECU 70 closes the separation valve 60, and thus completes the shift to the non-control mode.

Although the pressure-reducing linear control valve 67 is used in the foregoing description, it is also possible to use other pressure-reducing valves in the brake control device 20, for example, the ABS pressure-reducing valves 56 to 59 and, in particular, the ABS pressure-reducing valves 58, 59 at the regulator 33 side.

According to the second embodiment, the pressure-reducing control through the use of the pressure-reducing linear control valve 67 is executed concurrently with the adjustment of the open/close timings of the master cut-off valve 64, the regulator cut-off valve 65 and the separation valve 60 as described above in conjunction with the first embodiment. Since the wheel cylinder pressure is reduced through the use of the pressure-reducing linear control valve 67, the hydraulic pressure acting in the self-closure direction between the outlet and inlet openings of the regulator cut-off valve 65 can easily be made smaller than the self-closure-release pressure thereof. Besides, even in the case where the regulator cut-off valve 65 has a closed failure and therefore the regulator cut-off valve 65 cannot be opened as mentioned above in conjunction with the first embodiment, the confinement of wheel cylinder pressure can be prevented by the execution of the pressure-reducing control via the pressure-reducing linear control valve 67 or the like.

Furthermore, according to the second embodiment, even in the case where the master cut-off valve 64 or the separation valve 60 has a closed failure and therefore the wheel cylinder pressure cannot be drained to the master cylinder 32, the surplus wheel cylinder pressure can be drained via the pressure-reducing linear control valve 67. It is preferable from a fail-safe viewpoint to construct a plurality of paths for releasing the wheel cylinder pressure on the assumption of an abnormality at an arbitrary site. The securement of a path for releasing the wheel cylinder pressure without the intervention of the master cut-off valve 64 makes it possible to set the self-closure-release pressure of the master cut-off valve 64 smaller than the maximum wheel cylinder pressure, and is therefore also preferable in that the degree of freedom in the design of the master cut-off valve 64 is improved. Specifically, if the master cut-off valve 64 is in the self-closed state due to the differential pressure when the wheel cylinder pressure is at its maximum, the self-closed state of the master cut-off valve 64 can be dissolved by draining the surplus wheel cylinder pressure via another path, such as the pressure-reducing linear control valve 67 or the like.

As a first modification of the second embodiment, if the self-closure-release pressure of the master cut-off valve 64 is set smaller than the maximum wheel cylinder pressure, it is preferable that the valve-opening pressure of the separation valve 60 be set smaller than the self-closure-release pressure of the master cut-off valve 64. This construction can prevent the wheel cylinder pressure from being confined in the front-wheel wheel cylinders 23FR, 23FL downstream of the master cut-off valve 64 when the mode shifts to the backup brake mode at the time of a closed failure of the separation valve 60 due to a broken wire or the like.

In this case, it can happen that despite the valve-opening command, the master cut-off valve 64 remains in the self-closed state due to the differential pressure when the wheel cylinder pressure is made about as high as the maximum wheel cylinder pressure. When separation valve 60 is closed due to the closed failure, there is possibility of occurrence of the confinement of wheel cylinder pressure in the front-wheel wheel cylinders 23FR, 23FL.

At this stage, the brake ECU 70 sufficiently reduces the rear wheel-side wheel cylinder pressure, for example, to about the atmospheric pressure, by appropriately controlling a pressure-reducing valve, such as the pressure-reducing linear control valve 67 or the like, as in the foregoing embodiment. As a result, the differential pressure acting on the separation valve 60 becomes greater than the valve-opening pressure of the separation valve 60. This is because the pressure on the rear wheel side of the separation valve 60 has been sufficiently reduced while a high hydraulic pressure that is higher than the self-closure-release pressure of the master cut-off valve 64 has been confined on the front wheel side of the separation valve 60. As a result, the separation valve 60 is mechanically naturally opened even when the separation valve 60 has the closed failure. By appropriately continuing the pressure-reducing control, the front wheel-side wheel cylinder pressure can be released via the separation valve 60 and the pressure-reducing valve. When the differential pressure acting on the separation valve 60 is less than the valve-opening pressure of the valve 60 and therefore the separation valve 60 is closed, the differential pressure acting on the master cut-off valve 64 is less than the self-closure-release pressure thereof, so that the master cut-off valve 64 can be opened in accordance with the valve-opening command from the brake ECU 70. In this manner, the confinement of wheel cylinder pressure on the master cylinder 32 side can be prevented.

As a second modification of the second embodiment, if the self-closure-release pressure of the master cut-off valve 64 is set smaller than the maximum wheel cylinder pressure, it is desirable to set the valve-opening pressure of the pressure-reducing valve smaller than the self-closure-release pressure of the master cut-off valve 64. The pressure-reducing valve may be a pressure-reducing linear control valve 67 provided on a channel that connects the wheel cylinders 23 and the reservoir 34. This modification prevents the wheel cylinder pressure from being confined when the mode shifts to the backup brake mode at the time of a closed failure of the pressure-reducing valve due to a broken wire or the like.

In this case, if the wheel cylinder pressure is higher than the self-closure-release pressure of the master cut-off valve 64, the wheel cylinder pressure is also higher than the valve-opening pressure of the pressure-reducing linear control valve 67. Since the wheel cylinder pressure is the upstream pressure of the pressure-reducing linear control valve 67 while the downstream pressure thereof is the atmospheric pressure from the reservoir 34, the pressure-reducing linear control valve 67 is naturally opened, so that the surplus wheel cylinder pressure is released to the reservoir 34. When the wheel cylinder pressure becomes less than the valve-opening pressure of the pressure-reducing linear control valve 67 and therefore the pressure-reducing linear control valve 67 is naturally closed, the wheel cylinder pressure has already been less than the self-closure-release pressure of the master cut-off valve 64. Therefore, the master cut-off valve 64 is opened in accordance with the valve-opening command from the brake ECU 70, so that the confinement of wheel cylinder pressure is prevented.

Incidentally, in the case where the valve-opening pressure of the pressure-reducing linear control valve 67 is set smaller than the self-closure-release pressure of the master cut-off valve 64, it is preferable that the capability of supplying brake fluid from the power hydraulic pressure source 30 and the pressure-increasing linear control valve 66 to the wheel cylinders 23 be set sufficiently high. Therefore, it becomes possible to realize a desired wheel cylinder pressure by covering leakage that can occur during the normal control in the linear control mode because the valve-opening pressure of the pressure-reducing linear control valve 67 is set relatively low.

Furthermore, as a third modification of the second embodiment, the brake ECU 70 may tentatively close all the ABS retention valves 51 to 54 if the pressure-reducing linear control valve 67 has a closed failure due to a broken wire or the like when the wheel cylinder pressure is controlled to a high pressure during the execution of the VSC control or the TRC control. This is preferable in that due to the closure of the ABS retention valves 51 to 54, the wheel cylinder pressure is kept in the state occurring immediately prior to the occurrence of the closed failure, so that there is no further increase in pressure caused by inflow of brake fluid.

Then, in the case where the maximum wheel cylinder pressure is set larger than the self-closure-release pressure of the master cut-off valve 64, the wheel cylinder pressure may be drained by sending the valve-opening command to the master cut-off valve 64 while the ABS retention valves 51 to 54 are in the closed state. Conversely, in the case where the maximum wheel cylinder pressure is set smaller than the self-closure-release pressure of the master cut-off valve 64, the wheel cylinder pressure may be drained by the pressure reduction caused by mechanically opening the pressure-reducing linear control valve 67 as mentioned above. When the wheel cylinder pressure becomes lower than the self-closure-release pressure of the regulator cut-off valve 65, the brake ECU 70 re-opens the ABS retention valves 51 to 54 and also closes the separation valve 60 to complete the backup brake mode. As for the determination regarding whether or not the wheel cylinder pressure has become lower than the self-closure-release pressure of the regulator cut-off valve 65, the brake ECU 70 can carry out the determination on the basis of the measured value of the wheel cylinder pressure or on condition that the set time has elapsed, as in the first and second embodiments.

Incidentally, in the second embodiment, it is more preferable to increase the degree of opening of the pressure-reducing linear control valve 67 as much as possible, from a viewpoint of promptly eliminating or reducing the differential pressure acting on the regulator cut-off valve 65. However, a sharp pressure reduction during braking may possibly cause a sharp decline in the wheel cylinder pressure and may also cause deceleration declination phenomenon. In conjunction with this respect, a fourth modification of the second embodiment that is particularly suitable to the case where restraint of the deceleration declination phenomenon is considered important will next be described.

In the fourth modification of the second embodiment, the brake ECU 70 controls the pressure-reducing linear control valve 67 so that the pressure-reducing linear control valve 67 assumes an open state when the wheel cylinder pressure is greater than a set hydraulic pressure, and so that the pressure-reducing linear control valve 67 assumes a closed state when the wheel cylinder pressure is less than the set hydraulic pressure. The set hydraulic pressure is set smaller than the self-closure-release pressure of an open-close valve, particularly, the regulator cut-off valve 65, and is set larger than a minimum braking hydraulic pressure. Preferably, the set hydraulic pressure is set at a hydraulic pressure that corresponds to a desired vehicle deceleration. The minimum braking hydraulic pressure means a minimum wheel cylinder pressure that gives braking force to the wheel, for example, a minimum of the wheel cylinder pressure that causes a friction member, such as a brake pad or the like, to contact a rotating member that rotates together with the wheel.

This construction reduces the wheel cylinder pressure toward the set hydraulic pressure, so that the open-close valve is opened in accordance with the valve-opening command from the brake ECU 70 without being impeded by the differential pressure. Hence, the confinement of wheel cylinder pressure can be avoided. Besides, since the set hydraulic pressure is set larger than the minimum braking hydraulic pressure, the shift to the backup brake mode can be carried out while a certain amount of braking force is retained. In particular, in the case where the set hydraulic pressure is set at a hydraulic pressure that corresponds to a desired vehicle deceleration, the shift to the backup brake mode can be carried out while a desired braking force is being generated. Hence, it becomes possible to complete the shift of the brake mode during braking, without remarkably reducing the braking force. According to the fourth modification, the avoidance of the confinement of wheel cylinder pressure and the restraint of the deceleration declination phenomenon can both be accomplished.

As far as the mode shift during the non-braking state is concerned, it is considered that the reduction of the hydraulic pressure to the atmospheric pressure to avoid the pressure confinement will not cause any particular problem. However, during braking, it is desirable that braking force continue to be generated in accordance with a driver's request even during the control mode shifting operation. Hence, the fourth modification is preferable, particularly, at the time of shift to the backup brake mode during braking, in that the avoidance of the confinement of wheel cylinder pressure and the restraint of the deceleration declination phenomenon can both be accomplished.

According to the fourth modification, the brake ECU 70 may also open and close the pressure-reducing linear control valve 67 by controlling the control current of the pressure-reducing linear control valve 67 on the basis of the actual wheel cylinder pressure measured by the control pressure sensor 73. However, in respect of the further simplification of the control, the brake ECU 70 may supply a constant control current to the pressure-reducing linear control valve 67 so that the aforementioned set hydraulic pressure is equal to the valve-opening pressure while the pressure-reducing linear control valve 67 needs to be controlled. In this case, if the wheel cylinder pressure becomes greater than the set hydraulic pressure, the pressure-reducing linear control valve 67 naturally mechanically assumes the open state. On the other hand, if the wheel cylinder pressure becomes less than the set hydraulic pressure, the pressure-reducing linear control valve 67 assumes the closed state. Ordinarily, the brake ECU 70 controls the control current so that a desired degree of opening is realized even if the wheel cylinder pressure is sufficiently low, for example, the atmospheric pressure. Unlike this arrangement, in the fourth modification, the brake ECU 70 supplies a reduced control current to the pressure-reducing linear control valve 67 so that the pressure-reducing linear control valve 67 is mechanically opened or closed in accordance with the wheel cylinder pressure.

Figure 4:
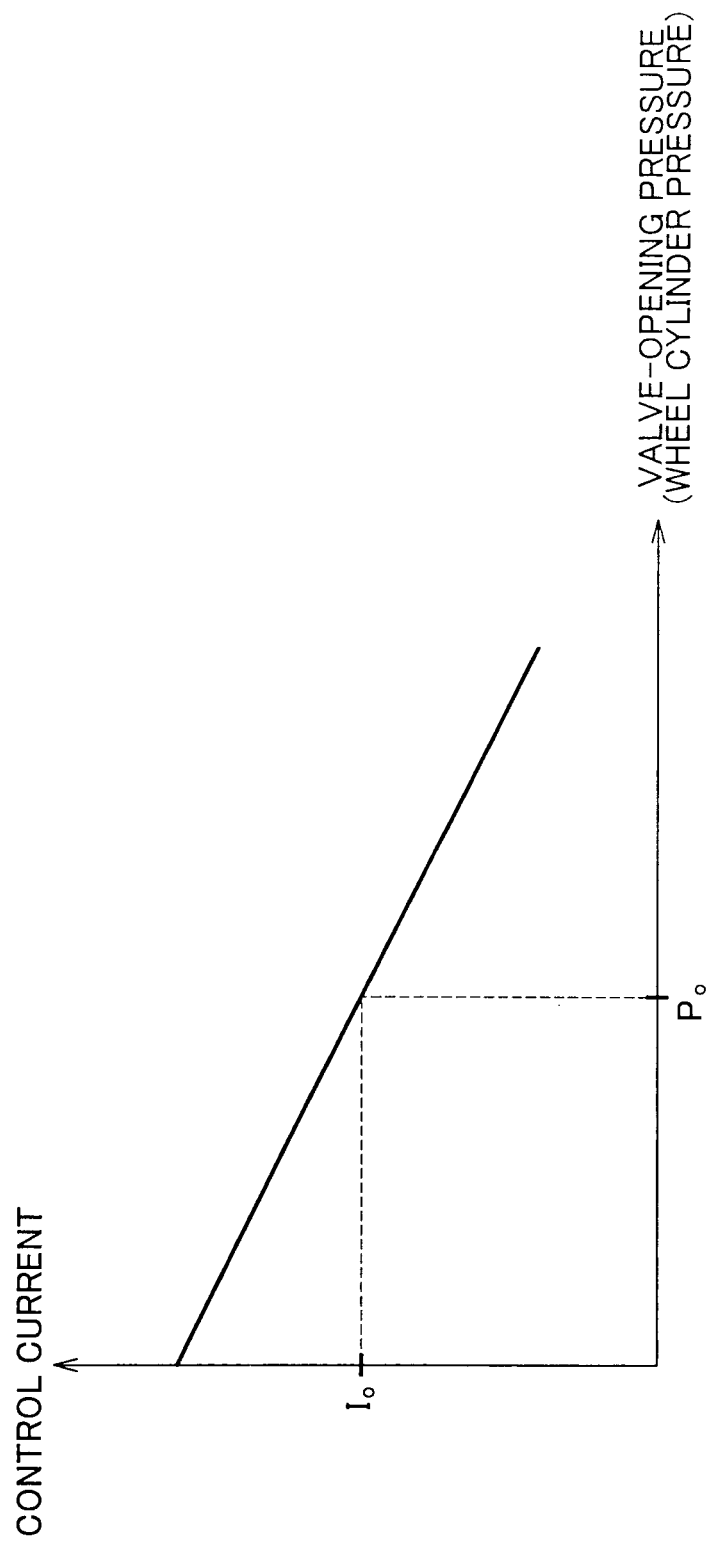
FIG. 4 is a diagram showing an example of a relationship between the control current and the valve-opening pressure of a pressure-reducing linear control valve in a fourth modification of the second embodiment.

FIG. 4 is a diagram showing an example of a relationship between the control current and the valve-opening pressure of the pressure-reducing linear control valve 67 in the fourth modification of the second embodiment. In FIG. 4, the vertical axis shows the control current supplied to the pressure-reducing linear control valve 67, and the horizontal axis shows the valve-opening pressure of the pressure-reducing linear control valve 67 in accordance with the control current. As shown in FIG. 4, the relationship between the control current and the valve-opening pressure of the pressure-reducing linear control valve 67 is a generally linear relationship in which the smaller the control current, the higher the valve-opening command. If, when a predetermined control current is supplied to the pressure-reducing linear control valve 67, the differential pressure acting on the pressure-reducing linear control valve 67 becomes greater than the valve-opening command shown in FIG. 4, then the pressure-reducing linear control valve 67 is mechanically opened. Conversely, if the differential pressure acting on the pressure-reducing linear control valve 67 becomes lower than the valve-opening command shown in FIG. 4, the pressure-reducing linear control valve 67 is mechanically closed. The differential pressure acting on the pressure-reducing linear control valve 67 is substantially equal to the wheel cylinder pressure since the pressure on the upstream side of the pressure-reducing linear control valve 67 is the wheel cylinder pressure and the pressure on the downstream side thereof is the atmospheric pressure. Incidentally, the characteristic shown in FIG. 4 may be measured and stored in the brake ECU 70 beforehand, or may also be measured and learned during braking or the like.

In the fourth modification, a set hydraulic pressure P0 is determined, and the wheel cylinder pressure corresponding to a desired vehicle deceleration is set as shown in FIG. 4. Therefore, from the relationship shown in FIG. 4, a control current I0 corresponding to the set hydraulic pressure P0 is found. During a period during which the pressure-reducing linear control valve 67 needs to be controlled in the second embodiment, the brake ECU 70 supplies the control current I0 to the pressure-reducing linear control valve 67. The period during which the pressure-reducing linear control valve 67 needs to be controlled corresponds to steps S22 to S26 in FIG. 3. Due to this arrangement, during the shift to the backup brake mode, too, the vehicle is braked at a vehicle deceleration that corresponds to the set hydraulic pressure P0, so that the deceleration declination phenomenon can be restrained.

The set hydraulic pressure P0 may be a fixed constant value or may also be appropriately varied. In the case where the hydraulic pressure P0 is varied, it is preferable that the brake ECU 70 vary the set hydraulic pressure P0 equally with and together with the regulator pressure. Due to this arrangement, the pressure-reducing linear control valve 67 is mechanically opened or closed so that the wheel cylinder pressure becomes equal to the regulator pressure. In the case where the wheel cylinder pressure and the regulator pressure are equal, it is possible to make small the reverse flow of brake fluid from the wheel cylinders 23 to the master cylinder unit 27 when the regulator cut-off valve 65 and the master cut-off valve 64 are opened. Therefore, the occurrence of a pedal shock is restrained, so that the shift to the brake mode for backup can be carried out while a relatively natural feeling is maintained.

Figure 5:
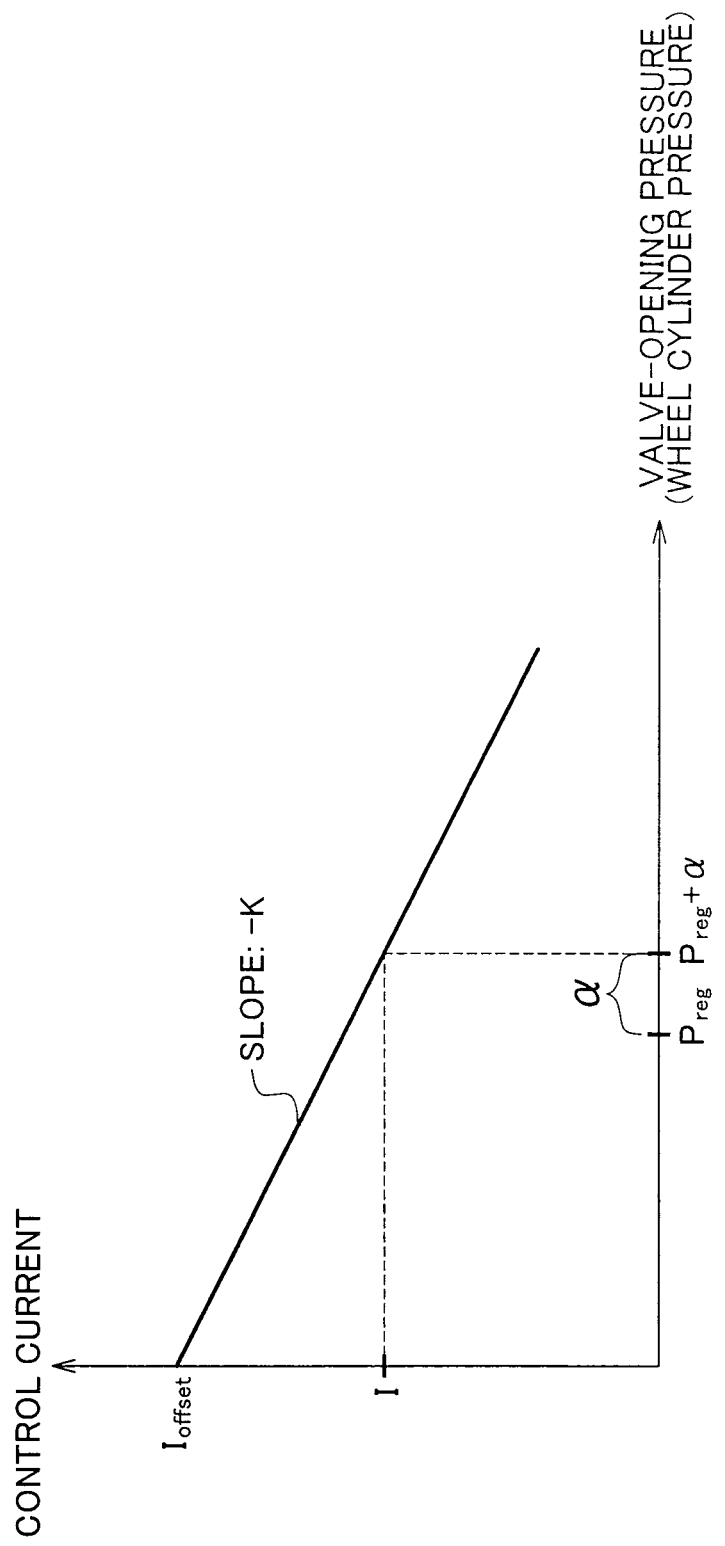
FIG. 5 is a diagram showing an example of a relationship between the control current and valve-opening pressure of the pressure-reducing linear control valve in the fourth modification of the second embodiment.

With reference to FIG. 5, the case where the valve-opening pressure of the pressure-reducing linear control valve 67 is varied equally with and together with the regulator pressure will be described. FIG. 5 is a diagram showing an example of a relationship between the control current and the valve-opening pressure of the pressure-reducing linear control valve 67 in a modification of the second embodiment. In this case, the control current I to the pressure-reducing linear control valve 67 can be computed, for example, from the following equation: I=−K(Preg+α)+Ioffset. In this equation, −K represents the slope of the characteristic line of the control current and the valve-opening pressure of the pressure-reducing linear control valve 67. K is a positive constant. As shown in FIG. 5, the slope of the characteristic line is negative, which is indicated by the negative sign. Besides, the regulator pressure Preg is given as a value measured by the regulator pressure sensor 71 to the brake ECU 70. α is a margin that is set so that the wheel cylinder pressure will not be excessively reduced due to the influence of the measurement error of the regulator pressure sensor 71 and the error in the characteristic shown in FIG. 5. By setting the control current at the value I that gives the valve-opening pressure Preg+α instead of the regulator pressure Preg, the value of control current that is less than the value of control current that corresponds to the value measured by the regulator pressure sensor 71 is set, so that excessive pressure reduction can be restrained. Besides, Ioffset is the intercept of the characteristic line on the vertical axis in FIG. 5, that is, the axis showing the control current.

Incidentally, in the case where an abnormality is detected in the regulator pressure sensor 71 or the case where although an abnormality is not detected, an effective measurement cannot be obtained for a very transient period due to the influence of noise or the like, the brake ECU 70 may supply, as appropriate, a constant control current to the pressure-reducing linear control valve 67. Or, from a viewpoint where the restraint of the deceleration declination phenomenon is considered important, the brake ECU 70 may set the control current to the pressure-reducing linear control valve 67 at zero so that the pressure-reducing linear control valve 67 will not reduce the pressure. The probability of the simultaneous occurrence of abnormalities at two or more locations in the brake control device 20 is very low. Therefore, in the case where the regulator pressure sensor 71 has an abnormality, the possibility of an abnormality occurring at a location other than the regulator pressure sensor 71, for example, in separation valve 60 or the master cut-off valve 64 or the like, is very low. Therefore, in this case, it is considered possible to prevent the confinement of wheel cylinder pressure by adjusting the open/close timings of the control valves as in the first embodiment without combined use of the pressure-reducing control performed via the pressure-reducing linear control valve 67.

Next, a third embodiment will be described. The third embodiment is a suitable embodiment for the case of the shift to the brake mode for backup due to detection of a leakage abnormality. The leakage abnormality is an abnormality that causes leakage of working fluid from a wheel cylinder 23. Examples of the leakage abnormality include the open failure or a small amount of leakage of a control valve, such as the pressure-reducing linear control valve 67 or the like, which is provided between the wheel cylinders 23 and the reservoir 34, leakage from a piping or the like near a wheel cylinder 23, etc.

In the linear control mode in accordance with this embodiment, the wheel cylinder pressures of all the four wheels are commonly controlled. Therefore, if a leakage abnormality occurs during execution of the linear control mode, the brake fluid leaks from all the four wheel cylinders 23 through the location of occurrence of the leakage abnormality, so that the wheel cylinder pressure declines. In the process of avoiding the confinement of wheel cylinder pressure illustrated above in conjunction with the first and second embodiments, the separation valve 60 is kept in the open state until the regulator cut-off valve 65 and the master cut-off valve 64 are opened. However, the later the separation valve 60 is closed, the more brake fluid leaks, and the lower the wheel cylinder pressure becomes.

Therefore, in the third embodiment, in the case of the shift to the brake mode for backup due to detection of a leakage abnormality, the brake ECU 70 sends the valve-closing command to the separation valve 60 to close the separation valve 60, substantially simultaneously with sending the valve-opening command to the master cut-off valve 64. Or, the brake ECU 70 sends the valve-closing command to the separation valve 60 to close the separation valve 60, substantially simultaneously with sending the valve-opening command to the regulator cut-off valve 65. Furthermore, the brake ECU 70 may also close the separation valve 60 prior to sending the valve-opening command to the master cut-off valve 64 and the regulator cut-off valve 65. On another hand, if the shift to the brake mode for backup is performed for a reason other than the detection of a leakage abnormality, the brake ECU 70 executes the control of avoiding the wheel cylinder pressure confinement as in the first and second embodiments.

Figure 6:
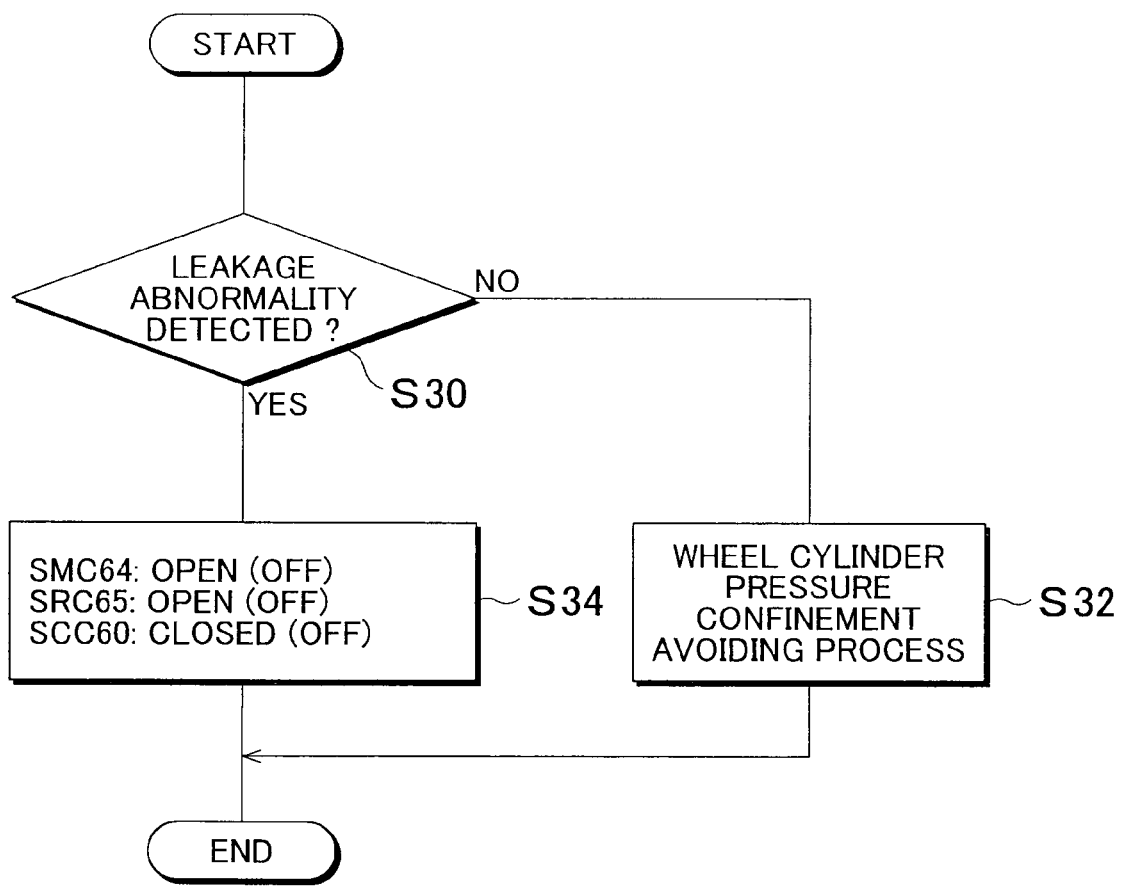
FIG. 6 is a flowchart for describing an example of the process of shifting to the backup brake mode in accordance with a third embodiment of the invention.

With reference to FIG. 6, a control mode shifting process in accordance with the third embodiment of the invention will be described in detail. FIG. 6 is a flowchart for describing an example of a process of shifting to the backup brake mode in accordance with the third embodiment. The process shown in FIG. 6 is started when the linear control mode needs to be discontinued due to detection of an abnormality, or the like. In the following description regarding the third embodiment, the description of the same portions or the like as those in the foregoing first embodiment will be omitted as appropriate.

When the process shown in FIG. 6 starts, the brake ECU 70 firstly determines whether or not the reason or cause for discontinuing the linear control mode is the detection of a leakage abnormality (S30). For example, the brake ECU 70 determines that there is possibility of occurrence of a leakage abnormality if a state in which the wheel cylinder pressure is lower than a target hydraulic pressure by more than a predetermined deviation continues for a predetermined time. The brake ECU 70 can execute this determination on the basis of the value measured by the control pressure sensor 73. Incidentally, as the cases where the wheel cylinder pressure is much lower than the target hydraulic pressure, abnormalities other than the leakage abnormality are also conceivable, for example, the closed failure of the pressure-increasing linear control valve 66 or the separation valve 60, or the like.

If it is determined that a leakage abnormality is not detected (NO in S30), the brake ECU 70 executes the process of avoiding the wheel cylinder pressure confinement as illustrated above in conjunction with the first embodiment or the second embodiment (S32). Specifically, the brake ECU 70 sends the valve-opening command to each of the master cut-off valve 64 and the regulator cut-off valve 65, and closes the separation valve 60 after the differential pressure acting on the regulator cut-off valve 65 has become smaller than the self-closure-release pressure thereof. During a period until the separation valve 60 is closed, the brake ECU 70 may execute the wheel cylinder pressure-reducing control via the pressure-reducing linear control valve 67 in accordance with need. In this manner, the brake ECU 70 completes the shift to the backup brake mode.

On the other hand, if it is determined that a leakage abnormality is detected (YES in S30), the brake ECU 70 stops the supply of the control current to each of the master cut-off valve 64, the regulator cut-off valve 65 and the separation valve 60 (S34). Therefore, with regard to the master cut-off valve 64 and the regulator cut-off valve 65, if the differential pressure acting on each of the two control valves is smaller than the self-closure-release pressure thereof, the control valves are opened. Besides, the separation valve 60 is closed. At this time, if it is determined that a leakage abnormality is detected and, after that, the driver continues depressing the brake pedal 24, the brake ECU 70 may stop the supply of the control current to each of the control valves. In addition, the brake ECU 70 stops the electrification of the pressure-increasing linear control valve 66 and the pressure-reducing linear control valve 67 to discontinue controlling the valves in order to discontinue the linear control mode, substantially simultaneously with stopping the electrification of the master cut-off valve 64 and the like, or prior to stopping the electrification of the master cut-off valve 64 and the like.

Thus, in the third embodiment, if a leakage abnormality is detected, the separation valve 60 is promptly closed. Hence, by separating the system in which a leakage abnormality has occurred, braking force can be continuously secured via the normal system in which a leakage abnormality has not occurred. This is preferable in terms of fail-safe design.

Next, a modification of the third embodiment will be described. In the foregoing third embodiment, if a leakage abnormality occurs on the front wheel side, that is, the master cylinder 32 side, the separation valve 60 is promptly closed. Therefore, in this case, possibility of confinement of hydraulic pressure on the rear wheel side, that is, the regulator 33 side, is conceivable. Therefore, in this modification, after the separation valve 60 is closed following detection of a leakage abnormality, the surplus hydraulic pressure in the wheel cylinders 23 is removed through the use of the pressure-reducing control performed via the pressure-reducing linear control valve 67.

Figure 7:
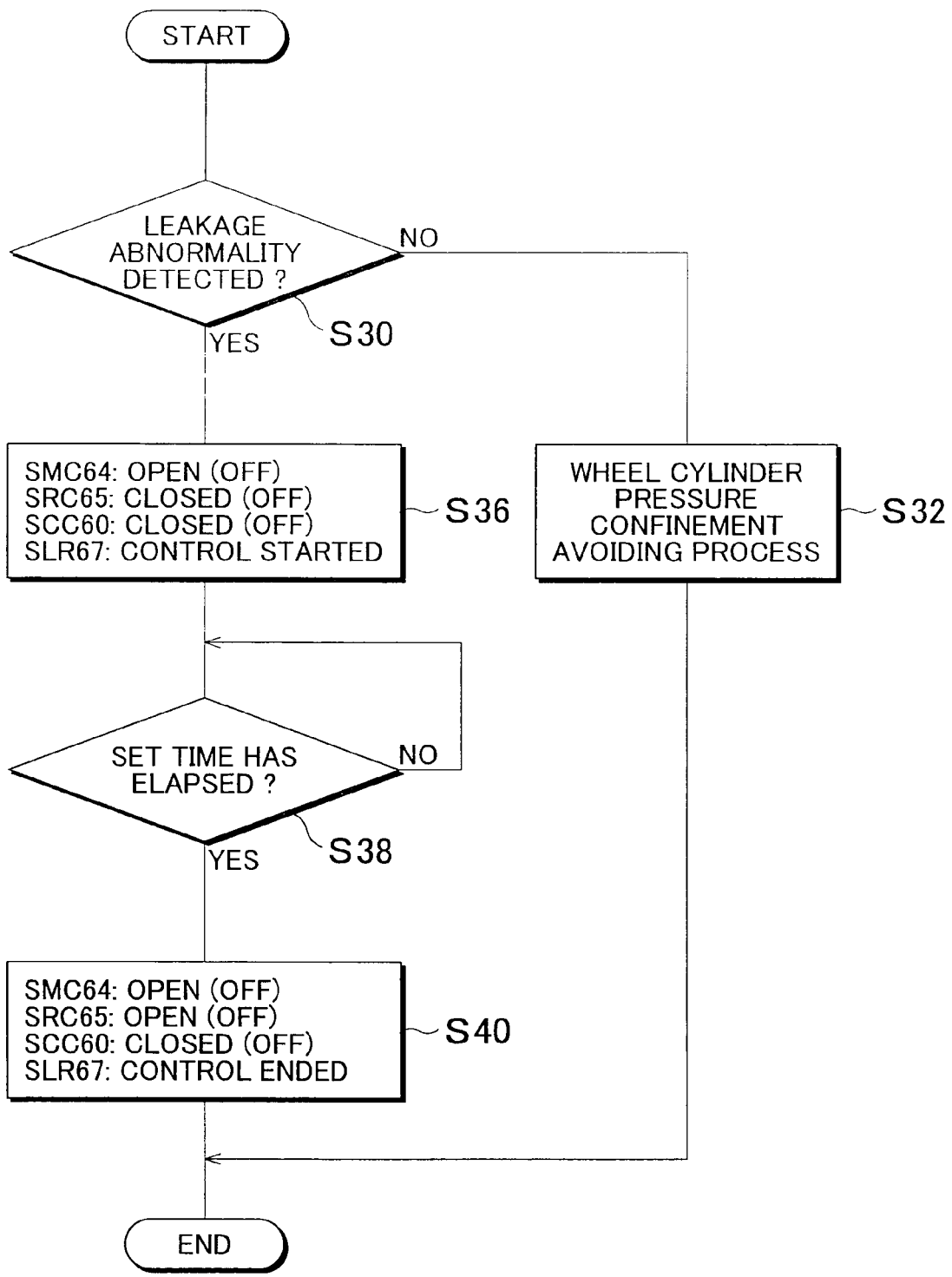
FIG. 7 is a flowchart for describing an example of the process of shifting to the backup brake mode in accordance with a modification of the third embodiment.

FIG. 7 is a flowchart for describing an example of a process of shifting the backup brake mode in accordance with a modification of the third embodiment. When the process shown in FIG. 7 starts, the brake ECU 70 firstly determines whether or not the reason or cause for discontinuing the linear control mode is the detection of a leakage abnormality (S30). If it is determined that a leakage abnormality has not been detected (NO in S30), the brake ECU 70 executes a wheel cylinder pressure confinement avoiding process as illustrated above in conjunction with the first embodiment or the second embodiment (S32).

If it is determined that a leakage abnormality has been detected (YES in S30), the brake ECU 70 stops the supply of the control current to each of the master cut-off valve 64, the regulator cut-off valve 65 and the separation valve 60 and also starts the pressure-reducing control by the pressure-reducing linear control valve 67 (S36). At this time, in the case where the leakage abnormality has occurred on the front wheel side, the front wheel-side wheel cylinder pressure drops as the brake fluid leaks; therefore, the master cut-off valve 64 comes to be opened due to the shut-off of the electrification. With regard to the regulator cut-off valve 65, in the case where at the time of detection of the leakage abnormality, the wheel cylinder pressure is controlled at high pressure and therefore the regulator cut-off valve 65 is receiving a differential pressure that is greater than the self-closure-release pressure thereof, the regulator cut-off valve 65 remains in the closed state despite the shut-off of the electrification.

Due to the pressure-reducing control started, the wheel cylinders 23RR, 23RL for the rear wheels are connected in communication to the reservoir 34 via the pressure-reducing linear control valve 67, and the surplus hydraulic pressure of the wheel cylinders 23 is released to the reservoir 34. Therefore, the pressure is reduced on the wheel cylinder side of the regulator cut-off valve 65, so that the differential pressure between the outlet and inlet openings of the regulator cut-off valve 65 is lessened.

Subsequently, the brake ECU 70 determines whether or not a set time for lessening the differential pressure has elapsed (S38). In this embodiment, after the separation valve 60 is closed, the control pressure sensor 73 that measures the wheel cylinder pressure is separated from the regulator 33 side system; therefore, the pressure-reducing control is executed for the set time that is set beforehand. This set time may be set in substantially the same manner as in the first embodiment. During the period during which the pressure-reducing control is to be executed, the brake ECU 70 may control the control current to the pressure-reducing linear control valve 67 so as to give appropriate braking force to the rear wheels as described above with reference to FIG. 4 or 5.

The brake ECU 70 does not proceed to the next step but wait while it is not determined that the set time for lessening the differential pressure has elapsed (NO in S38). When it is determined that the set time for lessening the differential pressure has elapsed (YES in S38), the brake ECU 70 ends the pressure-reducing control performed via the pressure-reducing linear control valve 67 (S40). At this time, it is highly likely that the differential pressure between the outlet and inlet openings of the regulator cut-off valve 65 has become smaller than the self-closure-release pressure thereof, therefore, the regulator cut-off valve 65 is naturally opened. Thus, the shift to the non-control mode is completed. In this manner, while the influence of a leakage abnormality on the normal system that does not have a leakage abnormality is restrained, the confinement of wheel cylinder pressure in the normal system can be avoided.

Incidentally, in this modification of the third embodiment, the brake ECU 70 may execute the pressure-reducing control after the closure of the separation valve 60 in the case where it is specifically determined that a leakage abnormality has occurred on the front wheel side. The leakage abnormality on the front wheel side can be specifically determined, for example, on the basis of an event in which the value measured by the control pressure sensor 73 does not decrease when the front wheel-side ABS retention valves 51, 52 are closed.

The invention claimed is:

1. A brake control device comprising:
    a plurality of wheel cylinders that are supplied with a working fluid and give braking force to a plurality of wheels, respectively;
    a wheel cylinder pressure control system that controls working fluid pressure of the plurality of wheel cylinders independently of brake operation of a driver;
    a manual hydraulic pressure source that pressurizes the working fluid contained in the manual hydraulic pressure source in accordance with amount of operation of a brake operating member performed by the driver;
    a separation valve that is caused to be in a closed state during a brake mode for backup in which the working fluid is supplied from the manual hydraulic pressure source to the plurality of wheel cylinders, and that, when in the closed state, separates a first path that supplies the working fluid to at least one wheel cylinder of the plurality of wheel cylinders, and a second path that supplies the working fluid to at least one wheel cylinder of the plurality of wheel cylinders excluding the at least one wheel cylinder supplied with the working fluid by the first path;
    an open-close valve that is provided between the manual hydraulic pressure source and the wheel cylinders, and that is kept in a closed state despite a valve-opening command, due to an effect of a differential pressure between an outlet opening and an inlet opening of the open-close valve, when the differential pressure is greater than a predetermined pressure during the closed state of the open-close valve; and
    a control portion that closes the separation valve after sending the valve-opening command so as to lessen the differential pressure so that the open-close valve is opened in accordance with the valve-opening command when discontinuing a control via the wheel cylinder pressure control system and causing a shift to the brake mode for backup.

2. The brake control device according to claim 1, wherein the manual hydraulic pressure source includes a first hydraulic pressure source that pressurizes the working fluid contained in the first hydraulic pressure source, in accordance with the amount of operation of the brake operating member performed by the driver, and a second hydraulic pressure source that adjusts the pressure of the working fluid in agreement with the working fluid pressure of the first hydraulic pressure source, and the open-close valve includes a first open-close valve provided on a first supply path that connects the first hydraulic pressure source and at least one wheel cylinder of the plurality of wheel cylinders, and a second open-close valve provided on a second supply path that connects the second hydraulic pressure source and at least one wheel cylinder of the plurality of wheel cylinders excluding the at least one wheel cylinder connected to the first hydraulic pressure source, and the first open-close valve is kept in the closed state despite the valve-opening command when the differential pressure between the outlet opening and the inlet opening of the first open-close valve is greater than a first predetermined pressure, and the second open-close valve is kept in the closed state despite the valve-opening command when the differential pressure between the outlet opening and the inlet opening of the second open-close valve is greater than a second predetermined pressure, and the second predetermined pressure is set smaller than a maximum value of the wheel cylinder pressure that is realized by the wheel cylinder pressure control system, and the first predetermined pressure is set larger than the maximum value.

3. The brake control device according to claim 2, wherein the separation valve is provided on a channel that connects the first supply path and the second supply path, and, during the brake mode for backup, separates the first supply path and the second supply path from each other, and the control portion sends the valve-opening command to each of the first open-close valve and the second open-close valve, and closes the separation valve after the differential pressure between the outlet opening and the inlet opening of the second open-close valve has become smaller than the second predetermined pressure.

4. The brake control device according to claim 3, wherein the control portion sends the valve-opening command to the second open-close valve prior to the valve-opening command to the first open-close valve.

5. The brake control device according to claim 3, wherein each of the first open-close valve, the second open-close valve and the separation valve is an electromagnetic control valve that is opened and closed corresponding to presence/absence of electrification with a control current, and the control portion shifts to the brake mode for backup by stopping the electrification of each of the first open-close valve, the second open-close valve and the separation valve with the control current, and an electric current characteristic of each of the first open-close valve, the second open-close valve and the separation valve is set so that when the electrification with the control current is stopped, the separation valve shifts to a non-electrified-time open/closed state later than the first open-close valve and the second open-close valve.

6. The brake control device according to claim 3, wherein the control portion closes the separation valve substantially simultaneously with sending the valve-opening commands to the first and second open-close valves or prior to sending the valve-opening commands to the first and second open-close valves, when the control portion shifts to the brake mode for backup due to detection of a leakage abnormality in which the working fluid leaks from at least one of the plurality of wheel cylinders.

7. The brake control device according to claim 2, further comprising a pressure-reducing valve provided on a channel that connects a reservoir that stores the working fluid and the plurality of wheel cylinders, wherein the control portion reduces the wheel cylinder pressure by controlling the pressure-reducing valve so that the differential pressure between the outlet opening and the inlet opening of the second open-close valve becomes smaller than the second predetermined pressure, and, after reducing the wheel cylinder pressure, closes the separation valve.

8. The brake control device according to claim 7, wherein the control portion controls the pressure-reducing valve so that the pressure-reducing valve is in an open state when the wheel cylinder pressure is greater than a set hydraulic pressure that is set smaller than the second predetermined pressure and that is set larger than a minimum hydraulic pressure that generates braking force, and so that the pressure-reducing valve is in the closed state when the wheel cylinder pressure is lower than the set hydraulic pressure.

9. The brake control device according to claim 1, wherein the control portion controls a discharge path of the working fluid from the plurality of wheel cylinders so as to lessen the differential pressure while keeping the wheel cylinder pressure higher than a minimum hydraulic pressure that generates braking force.

10. A brake control device comprising:

a plurality of wheel cylinders that are supplied with working fluid and that gives braking force to a wheel;

a wheel cylinder pressure control system that controls working fluid pressure of the wheel cylinder independently of brake operation of a driver;

a manual hydraulic pressure source that includes a first hydraulic pressure source that pressurizes the working fluid contained in the first hydraulic pressure source, in accordance with amount of operation of a brake operating member performed by the driver, and a second hydraulic pressure source that adjusts pressure of the working fluid in agreement with the working fluid pressure of the first hydraulic pressure source;

a first open-close valve provided on a first supply path that connects the first hydraulic pressure source and the at least one wheel cylinder; and a second open-close valve provided on a second supply path that connects the second hydraulic pressure source and the plurality of wheel cylinders, wherein the first open-close valve is kept in a closed state despite a valve-opening command due to an effect of a differential pressure between an outlet opening and an inlet opening of the first open-close valve when the differential pressure is greater than a first predetermined pressure during the closed state of the first open-close valve, and the second open-close valve is kept in the closed state despite the valve-opening command due to the effect of the differential pressure between an outlet opening and an inlet opening of the second open-close valve when the differential pressure is greater than a second predetermined pressure during the closed state of the second open-close valve, and the second predetermined pressure is set smaller than a maximum value of the wheel cylinder pressure that is realized by the wheel cylinder pressure control system, and the first predetermined pressure is set larger than the maximum value.

11. The brake control device according to claim 10, further comprising
a separation valve that is caused to be in the closed state during a brake mode for backup in which the working fluid is supplied from the manual hydraulic pressure source to the at least one wheel cylinder, and that, when in the closed state, separates a first path that supplies the working fluid to at least one of the plurality of wheel cylinders, and a second path that supplies the working fluid to one of the plurality of wheel cylinders excluding the at least one of the plurality of wheel cylinders that is supplied with the working fluid by the first path, wherein
the separation valve is provided on a channel that connects the first supply path and the second supply path, and, during the brake mode for backup, separates the first supply path and the second supply path from each other, and wherein when the valve-opening command is sent to each of the first open-close valve and the second open-close valve, the separation valve is closed after the differential pressure between the outlet opening and the inlet opening of the second open-close valve has become smaller than the second predetermined pressure.

12. The brake control device according to claim 11, wherein
the valve-opening command is sent to the second open-close valve prior to the valve-opening command to the first open-close valve.

13. The brake control device according to claim 11, wherein
each of the first open-close valve, the second open-close valve and the separation valve is an electromagnetic control valve that is opened and closed corresponding to presence/absence of electrification with a control current, and
a shift to the brake mode for backup is performed when the electrification of each of the first open-close valve, the second open-close valve and the separation valve with the control current is stopped, and an electric current characteristic of each of the first open-close valve, the second open-close valve and the separation valve is set so that when the electrification with the control current is stopped, the separation valve shifts to a non-electrified-time open/closed state later than the first open-close valve and the second open-close valve.

14. The brake control device according to claim 11, wherein
the separation valve is closed substantially simultaneously with the valve-opening commands being sent to the first and second open-close valves or prior to the valve-opening commands being sent to the first and second open-close valves, when the shift to the brake mode for backup is performed due to detection of a leakage abnormality in which the working fluid leaks from at least one of the at least one wheel cylinder.

15. The brake control device according to claim 10, further comprising
a pressure-reducing valve provided on a channel that connects a reservoir that stores the working fluid and the plurality of wheel cylinders, wherein
the wheel cylinder pressure is reduced by the pressure-reducing valve being controlled so that the differential pressure between the outlet opening and the inlet opening of the second open-close valve becomes smaller than the second predetermined pressure, and, after the wheel cylinder pressure is reduced, the separation valve is closed.

16. The brake control device according to claim 15, wherein
the pressure-reducing valve is controlled so that the pressure-reducing valve is in an open state when the wheel cylinder pressure is greater than a set hydraulic pressure that is set smaller than the second predetermined pressure and that is set larger than a minimum hydraulic pressure that generates braking force, and so that the pressure-reducing valve is in the closed state when the wheel cylinder pressure is lower than the set hydraulic pressure.

17. The brake control device according to claim 10, wherein
a discharge path of the working fluid from the plurality of wheel cylinders is controlled so as to lessen the differential pressure while keeping the wheel cylinder pressure higher than a minimum hydraulic pressure that generates braking force.

18. A brake control method comprising:
when a shift to a brake mode for backup involving separation of a supply path of working fluid is performed at a time of detection of an abnormality during braking,
keeping an open-close valve in a closed state despite a valve-opening command due to an effect of a differential pressure between an outlet opening and an inlet opening of the open-close valve when the differential pressure is greater than a predetermined pressure during the closed state of the open-close valve, the open-close valve is provided between a manual hydraulic pressure source that is used during the backup brake mode and wheel cylinders, and the open-close valve needs to be opened during the backup brake mode,
lessening the differential pressure acting between the outlet opening and the inlet opening of the open-close valve prior to the separation of the supply path of working fluid, and
opening the open-close valve in accordance with the valve-opening command sent to said open-close valve while a pressure of at least one of the wheel cylinders is kept higher than a minimum hydraulic pressure that generates braking force.

19. The brake control device according to claim 1, wherein the open-close valve includes a spring, and the predetermined pressure is a maximum value of the differential pressure between the outlet and inlet openings of the open-close valve that allows the open-close valve to be returned to the open state by a valve opening force of the spring.

* * * * *